US012108172B2

United States Patent
Nakagawa

(10) Patent No.: US 12,108,172 B2
(45) Date of Patent: Oct. 1, 2024

(54) VEHICLE CONTROL SYSTEM USING IMAGING DEVICE CAPABLE OF OBJECT DETECTION

(71) Applicant: SONY GROUP CORPORATION, Tokyo (JP)

(72) Inventor: Kei Nakagawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 58 days.

(21) Appl. No.: 17/760,189

(22) PCT Filed: Jan. 14, 2021

(86) PCT No.: PCT/JP2021/001100
§ 371 (c)(1),
(2) Date: Aug. 5, 2022

(87) PCT Pub. No.: WO2021/161712
PCT Pub. Date: Aug. 19, 2021

(65) Prior Publication Data
US 2023/0073748 A1    Mar. 9, 2023

(30) Foreign Application Priority Data

Feb. 14, 2020 (JP) ................. 2020-023295

(51) Int. Cl.
*H04N 25/57* (2023.01)
*H04N 7/18* (2006.01)
(Continued)

(52) U.S. Cl.
CPC ............. *H04N 25/57* (2023.01); *H04N 7/18* (2013.01); *H04N 23/12* (2023.01); *H04N 23/60* (2023.01)

(58) Field of Classification Search
CPC .......... H04N 25/57; H04N 7/18; H04N 23/12; H04N 23/60; H04N 7/183; H04N 23/61;
(Continued)

(56) References Cited

U.S. PATENT DOCUMENTS

2015/0341577 A1* 11/2015 Nakagawara ........ H04N 25/585
348/250
2017/0267178 A1* 9/2017 Shiga ................ H01L 27/14645
(Continued)

FOREIGN PATENT DOCUMENTS

JP    2005-258792 A    9/2005
JP    2010-267114 A    11/2010
(Continued)

OTHER PUBLICATIONS

International Search Report and Written Opinion of PCT Application No. PCT/JP2021/001100, issued on Mar. 30, 2021, 12 pages of ISRWO.

*Primary Examiner* — Padma Haliyur
(74) *Attorney, Agent, or Firm* — CHIP LAW GROUP

(57) ABSTRACT

An imaging device of the present disclosure includes a pixel array part in which pixels including photoelectric conversion units are disposed, an image processing unit for imaging that acquires captured image information on the basis of a pixel signal output from each pixel of the pixel array part, and an object recognition processing unit that acquires object recognition information on the basis of the pixel signal output from each pixel of the pixel array part. Further, a vehicle control system of the present disclosure has the imaging device having the aforementioned configuration.

12 Claims, 17 Drawing Sheets

(51) Int. Cl.
*H04N 23/12* (2023.01)
*H04N 23/60* (2023.01)

(58) Field of Classification Search
CPC .. H04N 23/617; H04N 25/134; H04N 25/585; H04N 23/55; B60W 40/02
See application file for complete search history.

(56) References Cited

U.S. PATENT DOCUMENTS

| | | | |
|---|---|---|---|
| 2018/0365461 A1* | 12/2018 | Wang | G06T 7/90 |
| 2019/0387188 A1* | 12/2019 | Kawazu | H04N 25/76 |
| 2020/0082248 A1* | 3/2020 | Villegas | G06N 3/044 |
| 2021/0374836 A1* | 12/2021 | Bronicki | G06Q 10/06315 |
| 2022/0207884 A1* | 6/2022 | Tsukada | G06V 10/764 |
| 2022/0417390 A1* | 12/2022 | Akimoto | H04N 9/43 |

FOREIGN PATENT DOCUMENTS

| | | | | |
|---|---|---|---|---|
| JP | 2012-138723 A | 7/2012 | | |
| JP | 2013-197670 A | 9/2013 | | |
| JP | 2015-220716 A | 12/2015 | | |
| JP | 2017-068462 A | 4/2017 | | |
| JP | 2018-182602 A | 11/2018 | | |
| JP | 2019-021013 A | 2/2019 | | |
| JP | 2019-067078 A | 4/2019 | | |
| WO | 2011/108217 A1 | 9/2011 | | |
| WO | 2017/158983 A1 | 9/2017 | | |
| WO | 2017/203794 A1 | 11/2017 | | |
| WO | WO-2018142706 A1 * | 8/2018 | | H04N 25/68 |
| WO | 2019/244239 A1 | 12/2019 | | |

* cited by examiner

VEHICLE CONTROL SYSTEM USING IMAGING DEVICE CAPABLE OF OBJECT DETECTION

CROSS REFERENCE TO RELATED APPLICATIONS

This application is a U.S. National Phase of International Patent Application No. PCT/JP2021/001100 filed on Jan. 14, 2021, which claims priority benefit of Japanese Patent Application No. JP 2020-023295 filed in the Japan Patent Office on Feb. 14, 2020. Each of the above-referenced applications is hereby incorporated herein by reference in its entirety.

TECHNICAL FIELD

The present disclosure relates to an imaging device and a vehicle control system.

BACKGROUND ART

In recent years, the development of automatic driving systems has been promoted with the aim of creating a safe road traffic society. In an automatic driving system, an imaging device serving as the human eyes during automatic driving is indispensable. In addition to the imaging device that acquires captured image information, the automatic driving system is also equipped with a detection device for detecting an object using radar waves such as millimeter waves, laser, and ultrasonic waves, for example (PTL 1).

It is possible to detect objects around a host vehicle, for example, pedestrians, obstacles, traffic lights, vehicles traveling before, beside and behind the host vehicle, and the like, by using an imaging device that acquires captured image information in combination with a detection device that acquires object detection information using, for example, radar waves.

CITATION LIST

Patent Literature

[PTL 1]
JP 2019-021013 A

SUMMARY

Technical Problem

Although an object around a host vehicle can be detected by using the detection device and the imaging device in combination in the aforementioned conventional technology, it is necessary to install the detection device that acquires object detection information in addition to the imaging device that acquires captured image information, which causes the number of parts and the price of a vehicle control system to increase.

Therefore, an object of the present disclosure is to provide an imaging device capable of acquiring captured image information and object detection information independently, and a vehicle control system including this imaging device.

Solution to Problem

An imaging device of the present disclosure to accomplish the aforementioned object includes a pixel array part in which pixels including photoelectric conversion units are disposed, an image processing unit for imaging that acquires captured image information on the basis of a pixel signal output from each pixel of the pixel array part, and an object recognition processing unit that acquires object recognition information on the basis of the pixel signal output from each pixel of the pixel array part.

In addition, a first vehicle control system of the present disclosure to accomplish the aforementioned object includes an imaging device, wherein the imaging device includes a pixel array part in which pixels including photoelectric conversion units are disposed, an image processing unit for imaging that acquires captured image information on the basis of a pixel signal output from each pixel of the pixel array part, and an object recognition processing unit that acquires object recognition information on the basis of the pixel signal output from each pixel of the pixel array part.

In addition, a second vehicle control system of the present disclosure to accomplish the aforementioned object includes an imaging device, an image signal processing unit that processes a pixel signal output from the imaging device, and a signal processing unit that processes a signal processed by the image signal processing unit, wherein the imaging device includes a pixel array part in which pixels including photoelectric conversion units are disposed, and a read circuit that reads signals from a plurality of the pixels of the pixel array part, the image signal processing unit includes an image processing unit for imaging that acquires captured image information on the basis of the pixel signal output from the imaging device, and an object recognition processing unit that acquires object recognition information on the basis of the pixel signal output from the imaging device, and the signal processing unit acquires information on a distance between a host vehicle equipped with the imaging device and an object around the host vehicle on the basis of the object recognition information acquired by the object recognition processing unit, and when the distance between the host vehicle and surrounding objects is less than a predetermined threshold value, determines that the host vehicle is in a dangerous driving state, and acquires the captured image information through the image processing unit for imaging.

DESCRIPTION OF EMBODIMENTS

Figure 1:
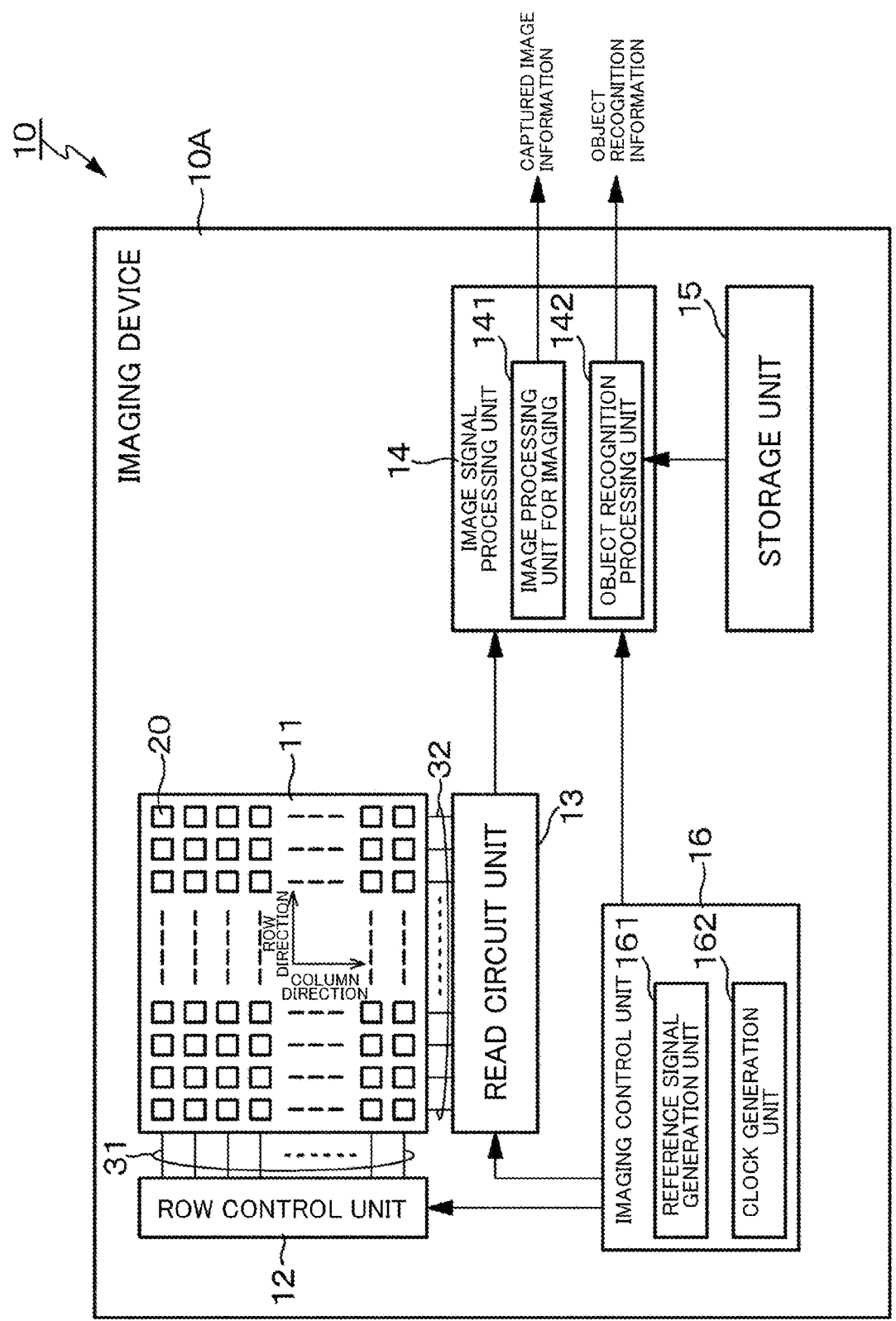
FIG. 1 is a block diagram showing an example of a system configuration of an imaging device according to an embodiment of the present disclosure.

Hereinafter, forms for carrying out the technology of the present disclosure (hereinafter, referred to as "embodiments") will be described in detail with reference to the drawings. The technology of the present disclosure is not limited to these embodiments. In the following description, the same reference numerals will be used for the same elements or elements having the same function and redundant description will be omitted. Description will be given in the following order.

1. Description of overview of imaging device and vehicle control system of present disclosure
2. Imaging device according to embodiment of present disclosure
 2-1. System configuration example of imaging device
 2-2. Circuit configuration example of pixel
 2-3. Circuit operation example of pixel
3. Vehicle control system according to first embodiment of present disclosure
4. Vehicle control system according to second embodiment of present disclosure
5. Vehicle control system according to third embodiment of present disclosure
6. Vehicle control system according to fourth embodiment of present disclosure
 6-1. Example 1 (control example of vehicle control system during automatic driving)
 6-2. Example 2 (series of control procedures of vehicle control system during automatic driving)
 6-3. Example 3 (control example in place where plurality of vehicles or objects are present)
 6-4. Example 4 (control example when host vehicle is overtaken by neighboring vehicle)
 6-5. Example 5 (control example when host vehicle overtakes neighboring vehicle)
7. Modified example
8. Example of application of technology according to present disclosure (example of moving body)
9. Configurations that can be adopted by present disclosure DESCRIPTION OF OVERVIEW OF IMAGING DEVICE AND FIRST AND SECOND VEHICLE CONTROL SYSTEMS OF PRESENT DISCLOSURE In an imaging device and a vehicle control system of the present disclosure, a configuration in which a color filter array including a colorless filter is provided in a pixel array part can be employed. Here, it is desirable to employ a configuration in which an image processing unit for imaging performs image processing using a neural network to which deep learning is applied and outputs captured image information.

In the imaging device and the first and second vehicle control systems of the present disclosure including the above-described desirable configuration, it is possible to employ a configuration in which an object recognition processing unit performs object recognition using a neural network to which deep learning is applied and outputs object recognition information.

Further, in the imaging device and the first and second vehicle control systems of the present disclosure including the above-described desirable configuration, it is possible to employ a configuration in which each pixel of the pixel array part has a plurality of photoelectric conversion units having different sensitivities. It is desirable to employ a configuration in which the plurality of photoelectric conversion units are composed of a photoelectric conversion unit having a relatively large light receiving area and a photoelectric conversion unit having a relatively small light receiving area.

Further, in the first and second vehicle control systems of the present disclosure including the above-described desirable configuration, it is possible to employ a configuration including at least one of a laser scanner, a millimeter-wave radar, and an ultrasonic sensor in addition to the imaging device.

Further, in the first and second vehicle control systems of the present disclosure including the above-described desirable configuration, it is possible to employ a configuration in which analog data is input to the image processing unit for imaging and the object recognition processing unit from the pixel array part and at least one of a laser scanner, a millimeter-wave radar, and an ultrasonic sensor. Here, it is possible to employ a configuration in which the object recognition processing unit includes a previous-stage circuit unit that performs object detection using a neural network to which deep learning is applied on the basis of analog data, and a subsequent-stage circuit unit that performs object recognition using the neural network to which deep learning is applied on the basis of output data of the previous-stage circuit unit.

Further, in the first and second vehicle control systems of the present disclosure including the above-described desirable configuration, it is possible to employ a configuration in which an image signal processing unit is included in the imaging device.

In the second vehicle control system of the present disclosure including the above-described desirable configuration, it is possible to employ a configuration in which the object recognition processing unit acquires information on a distance between a host vehicle and an object around the host vehicle on the basis of a signal input from at least one of the imaging device, the laser scanner, the millimeter-wave radar, and the ultrasonic sensor.

Further, in the second vehicle control system of the present disclosure including the above-described desirable configuration, it is possible to employ a configuration in which a signal processing unit determines a case in which a distance between a host vehicle and an object around the host vehicle is less than a predetermined threshold value as a dangerous driving state, acquires a captured image through the image processing unit for imaging, and performs processing of causing a display device to display the captured image or processing of causing a storage unit to store the captured image.

Imaging Device According to Embodiment of Present Disclosure

System Configuration Example of Imaging Device

In an embodiment of the present disclosure, a complementary metal oxide semiconductor (CMOS) image sensor, which is a kind of an X-Y address type imaging device, will be described as an example of the imaging device. A CMOS image sensor is an image sensor manufactured by applying or partially using a CMOS process.

FIG. 1 is a block diagram showing an example of a system configuration of an imaging device according to an embodiment of the present disclosure. As shown in FIG. 1, the imaging device 10 according to the present embodiment includes a pixel array part 11, a row control unit 12, a read circuit unit 13, an image signal processing unit 14, a storage unit 15, and an imaging control unit 16.

The pixel array part 11 is configured in such a manner that pixels 20 including a photoelectric conversion unit that generates an amount of photocharge depending on the amount of incident light are two-dimensionally disposed in a matrix form. In the pixel array part 11, a pixel control line 31 ($31_1$ to $31_m$) is wired for each pixel row in a row direction with respect to a pixel array of m rows and n columns. One end of the pixel control line 31 is connected to an output terminal of the row control unit 12, which corresponds to one pixel row. In FIG. 1, the pixel control line 31 ($31_1$ to $31_m$) is shown as one wire, but the pixel control line is not limited to one. Vertical signal lines 32 ($32_1$ to $32_n$) are further wired for each pixel column in a column direction in the pixel array part 11.

The row control unit 12 is a pixel driving unit that is composed of a shift register, an address decoder, and the like and drives each pixel 20 of the pixel array part 11, for example, simultaneously for all pixels or in units of pixel rows. Although the specific configuration of the row control unit 12 is not shown, it has a read scanning system and a sweep scanning system and can perform batch sweeping and batch transfer according to driving by these scanning systems.

The read scanning system selectively scans each pixel 20 of the pixel array part 11, for example, in units of pixel rows, in order to read signals from the pixels 20. In the case of row driving (rolling shutter operation), with respect to sweeping, sweep scanning is performed a time corresponding to a shutter speed in advance of read scanning for a read row in which read scanning is performed by the read scanning system. Further, in the case of global exposure (global shutter operation), batch sweeping is performed a time corresponding to a shutter speed in advance of batch transfer.

By this sweeping, unnecessary charge is swept from the photoelectric conversion units of pixels 20 in a read row. Then, so-called an electronic shutter operation is performed by sweeping (resetting) unnecessary charge. Here, the electronic shutter operation refers to an operation of discarding photocharge of the photoelectric conversion units and starting new exposure (starting accumulation of photocharge).

A signal read by a read operation through the read scanning system corresponds to the amount of light incident after the immediately previous read operation or electronic shutter operation. In the case of row driving, a period from a read timing of the immediately previous read operation or a sweeping timing of the electronic shutter operation to a read timing of the current read operation is a photocharge accumulation period (exposure period) in the pixels 20. In the case of global exposure, a period from batch sweeping to batch transfer is an accumulation period (exposure period).

A pixel signal output from each pixel 20 of a pixel row selected by the row control unit 12 is supplied to the read circuit unit 13 through each of the vertical signal lines 32 ($32_1$ to $32_n$). The read circuit unit 13 is composed of a constant current source electrically connected to the vertical signal line 32, an analog-to-digital converter (ADC) that converts analog pixel signals output from the pixels 20 into digital pixel signals, and the like and, for example, is a column read circuit unit provided for each pixel column.

As the analog-to-digital converter in the read circuit unit 13, for example, a single slope type analog-to-digital converter, which is an example of a reference signal comparison type analog-to-digital converter, can be used. However, the analog-to-digital converter is not limited to a single slope type analog-to-digital converter, and a serial comparison type analog-to-digital converter, a delta-sigma modulation type ($\Delta\Sigma$ modulation type) analog-to-digital converter, and the like can be used.

The image signal processing unit 14 has, for example, an arithmetic processing function, and performs predetermined signal processing on a pixel signal read from each pixel 20 of the pixel array part 11 through the read circuit unit 13. For example, the image signal processing unit 14 is configured to include an image processing unit 141 for imaging and an object recognition processing unit 142.

In the image signal processing unit 14, the image processing unit 141 for imaging acquires information on an image captured by the imaging device 10, that is, captured image information on the basis of a pixel signal output from each pixel 20 of the pixel array part 11 through the read circuit unit 13 and outputs the captured image information.

The object recognition processing unit 142 acquires information obtained through recognition processing performed on an object captured by the imaging device 10 on the basis of a pixel signal output from each pixel 20 of the pixel array part 11 through the read circuit unit 13, that is, object recognition information and outputs the object recognition information. Here, assuming that the imaging device 10 is mounted and used in, for example, a vehicle control system which will be described later, a pedestrian, an obstacle, a traffic light, a vehicle traveling before, behind or beside a host vehicle, and the like can be exemplified as an object.

The object recognition processing unit 142 may perform object recognition on an object captured by the imaging device 10 using, for example, known pattern recognition or machine learning called a neural network (DNN: Deep Neural Network) to which deep learning is applied. More specifically, for example, in pattern recognition, object recognition can be performed by comparing feature points of an object as teacher data with feature points of an object image captured by the imaging device 10.

Information such as feature points of an object used as teacher data in the aforementioned pattern recognition is stored in advance in the storage unit 15. In addition, information such as feature points of an object stored in the storage unit 15 is compared with feature points of an object image captured by the imaging device 10 and used as teacher data at the time of performing pattern recognition during object recognition in the object recognition processing unit 142.

The imaging control unit 16 is a system control unit that supplies various timing signals and clock signals to the row control unit 12, the read circuit unit 13, the image signal processing unit 14, and the like to control the imaging device 10 as a whole and, for example, includes a reference signal generation unit 161 and a clock generation unit 162.

The reference signal generation unit 161 generates a reference signal used in the analog-to-digital converter when the analog-to-digital converter in the read circuit unit 13 is a single slope type analog-to-digital converter. The reference signal generation unit 161 can be configured using, for example, a digital-to-analog converter or the like.

The clock generation unit 162 generates a clock signal used by the row control unit 12, the read circuit unit 13, the image signal processing unit 14, and the like. The clock generation unit 162 can be configured using, for example, a phase locked loop (PLL) circuit or the like.

Circuit Configuration Example of Pixel

Figure 2:
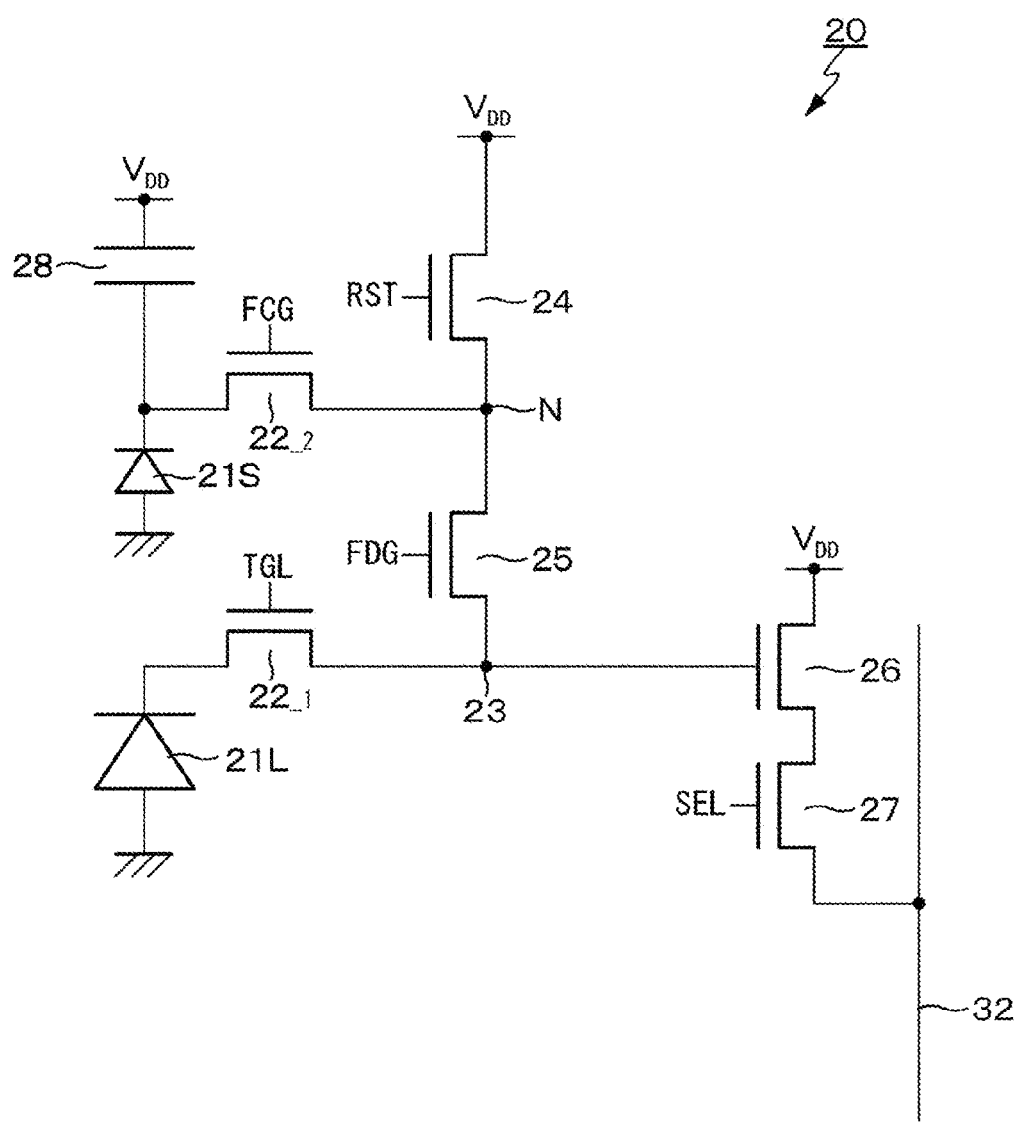
FIG. 2 is a circuit diagram showing an example of a pixel circuit configuration.

FIG. 2 is a circuit diagram showing an example of a circuit configuration of the pixel 20. The pixel 20 has a plurality of photoelectric conversion units having different sensitivities, for example, two photoelectric conversion units, and has a configuration in which, for example, photodiodes are used as the two photoelectric conversion units.

The pixel 20 has a photodiode 21L and a photodiode 21S having different sensitivities. The photodiode 21L has relatively high sensitivity and is formed to have a relatively large light receiving area, for example. The photodiode 21S has relatively low sensitivity and is formed to have a relatively small light receiving area, for example.

The high-sensitivity photodiode 21L and the low-sensitivity photodiode 21S have anode electrodes connected to a low-potential power supply (for example, ground), photoelectrically convert received light into photocharge (here, photoelectrons) depending on the amount of received light, and accumulate the photocharge.

In addition to the photodiode 21L and the photodiode 21S, the pixel 20 has a circuit configuration including two transfer transistors $22_{-1}$ and $22_{-2}$, a floating diffusion unit 23, a reset transistor 24, a connection transistor 25, an amplification transistor 26, a select transistor 27, and a pixel internal capacitance element 28.

Here, an N-channel MOS field effect transistor (FET) is used as the transfer transistors $22_{-1}$ and $22_{-2}$, the reset transistor 24, the connection transistor 25, the amplification transistor 26, and the select transistor 27, for example. However, combinations of transistor conductivity types illustrated here are merely examples and there is no limitation to these combinations.

One transfer transistor $22_{-1}$ is connected between the cathode electrode of the high-sensitivity photodiode 21L and the floating diffusion unit 23. A transfer signal TGL in which a high level (for example, a level $V_{DD}$) is active is applied to the gate electrode of the transfer transistor $22_{-1}$ from the row control unit 12.

The other transfer transistor $22_{-2}$ is connected between the cathode electrode of the low-sensitivity photodiode 21S and a connection node N between the reset transistor 24 and the connection transistor 25. A transfer signal FCG in which a high level (for example, the level $V_{DD}$) is active is applied to the gate electrode of the transfer transistor $22_{-2}$ from the row control unit 12.

The floating diffusion unit 23 is a charge-voltage conversion unit that converts charge into a voltage.

The reset transistor 24 is connected between a power supply line of a power supply voltage $V_{DD}$ and the connection node N. A reset signal RST in which a high level (for example, the level $V_{DD}$) is active is applied to the gate electrode of the reset transistor 24 from the row control unit 12.

The connection transistor 25 is connected between the connection node N and the floating diffusion unit 23. A connection signal FDG in which a high level (for example, the level $V_{DD}$) is active is applied to the gate electrode of the connection transistor 25 from the row control unit 12.

In the amplification transistor 26, the gate electrode is connected to the floating diffusion unit 23 and the drain electrode is connected to the power supply line of the power supply voltage $V_{DD}$.

The select transistor 27 is connected between the source electrode of the amplification transistor 26 and the vertical signal line 32. A select signal SEL in which a high level (for example, the level $V_{DD}$) is active is applied to the gate electrode of the select transistor 27 from the row control unit 12.

The pixel internal capacitance element 28 is connected between the power supply line of the power supply voltage $V_{DD}$ and the cathode electrode of the low-sensitivity photodiode 21S and stores charge photoelectrically converted by the low-sensitivity photodiode 21S.

As described above, the pixel 20 has the two photodiodes 21L and 21S having different sensitivities. Accordingly, the imaging device 10 according to the present embodiment in which the pixels 20 are disposed in a matrix form can capture a good image regardless of whether an environment has low illuminance or high illuminance.

Circuit Operation Example of Pixel

Next, an example of the circuit operation of the pixel 20 having the above circuit configuration will be described with reference to a timing chart of FIG. 3. The timing chart of FIG. 3 shows timing relationships between the select signal SEL, the connection signal FDG, the reset signal RST, the transfer signal FCG, and the transfer signal TGL.

Figure 3:
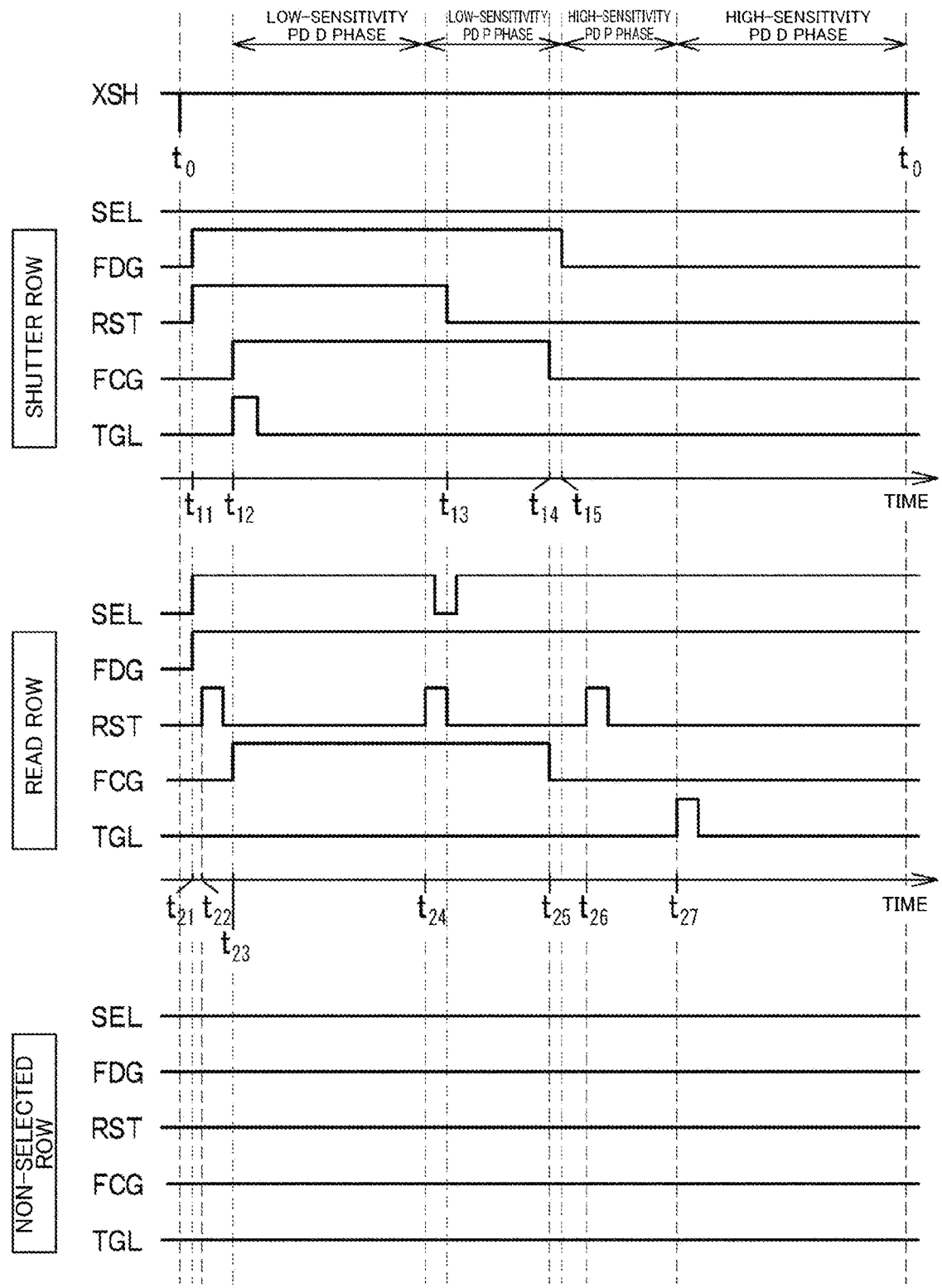
FIG. 3 is a timing chart for describing an example of a pixel circuit operation.

In the timing chart of FIG. 3, a horizontal synchronization signal XSH that becomes active at a time $t_0$ is a signal for synchronizing operations of pixels 20 in one pixel row in one horizontal period. Further, in the timing chart of FIG. 3, a photodiode is denoted by "PD."

When a pixel row including a predetermined pixel 20 becomes a shutter row, the connection signal FDG and the reset signal RST are brought to a high level at a time $t_{11}$ in one horizontal period in which the pixel row is driven, and the connection transistor 25 and the reset transistor 24 are brought to a conductive state. Accordingly, the floating diffusion unit 23 is electrically connected to the power supply line of the power supply voltage $V_{DD}$ via the connection transistor 25 and the reset transistor 24, and charge accumulated in the floating diffusion unit 23 is discharged to the power supply line of the power supply voltage $V_{DD}$.

Next, the transfer signal TGL and the transfer signal FCG are brought to a high level and the transfer transistor $22_{-1}$ and the transfer transistor $22_{-2}$ are brought to a conductive state at a time $t_{12}$. Accordingly, charge accumulated in the high-sensitivity photodiode 21L and the low-sensitivity photodiode 21S are also discharged to the power supply line of the power supply voltage $V_{DD}$ via the connection transistor 25 and the reset transistor 24 in the conductive state. Then, accumulation of charge associated with photoelectric conversion in the high-sensitivity photodiode 21L and the low-sensitivity photodiode 21S is started.

Thereafter, the reset signal RST is brought to a low level at a time $t_{13}$, the transfer signal FCG is brought to a low level then at a time $t_{14}$, and then the connection signal FDG is brought to a low level at a time tis. In the shutter row, the select signal SEL is always in a low level state.

Subsequently, when the pixel row including the predetermined pixel 20 is selected as a read row by the row control unit 12, the select signal SEL is brought to a high level at a time $t_{21}$, and the select transistor 27 is brought to a conductive state. Accordingly, the amplification transistor 26 is connected to the vertical signal line 32 via the select transistor 27.

At the same timing $t_{21}$ as the select signal SEL, the connection signal FDG is brought to a high level and the connection transistor 25 is brought to a conductive state, and thus the floating diffusion unit 23 is electrically connected to the reset transistor 24. In this state, at a time $t_{22}$, the reset signal RST is brought to a high level in a pulse shape and the reset transistor 24 is brought to a conductive state, and thus the floating diffusion unit 23 is reset.

Subsequently, at a time $t_{23}$, the transfer signal FCG is brought to a high level and the transfer transistor $22_{-2}$ is brought to a conductive state, and thus photoelectric conversion is performed in the low-sensitivity photodiode 21S and charge accumulated in the pixel internal capacitance element 28 is transferred to the floating diffusion unit 23 through the transfer transistor $22_{-2}$ and the connection transistor 25. Then, a data level corresponding to the charge photoelectrically converted by the low-sensitivity photodiode 21S is read as a D phase (low-sensitivity PD D phase) of the low-sensitivity photodiode 21S.

After the D phase of the low-sensitivity photodiode 21S is read, the reset signal RST is brought to a high level in a pulse shape at a time $t_{24}$ and the reset transistor 24 is brought to a conductive state. Accordingly, the floating diffusion unit 23 is reset through the reset transistor 24 and the connection transistor 25 in the conductive state. Then, the reset level of the floating diffusion unit 23 at this time is read as a P phase (low-sensitivity PD P phase) of the low-sensitivity photodiode 21S.

Thereafter, the transfer signal FCG is brought to a low level and the transfer transistor $22_{-2}$ is brought to a non-conductive state at a time $t_{25}$, and then the reset signal RST is brought to a high level in a pulse shape and the reset transistor 24 is brought to a conductive state at a time $t_{26}$. Accordingly, the floating diffusion unit 23 is reset through the reset transistor 24 and the connection transistor 25 in the conductive state. Then, the reset level of the floating diffusion unit 23 at this time is read as a P phase (high-sensitivity PD P phase) of the high-sensitivity photodiode 21L.

Thereafter, the transfer signal TGL is brought to a high level in a pulse shape and the transfer transistor $22_{-1}$ is brought to a conductive state at a time $t_{27}$, and thus charge photoelectrically converted by the high-sensitivity photodiode 21L is transferred to the floating diffusion unit 23. Then, a data level corresponding to the charge photoelectrically converted by the high-sensitivity photodiode 21L is read as a D phase (high-sensitivity PD D phase) of the high-sensitivity photodiode 21L.

Further, in a non-selected row that is not selected by the row control unit 12, all of the horizontal synchronization signal XSH, the select signal SEL, the connection signal FDG, the reset signal RST, the transfer signal FCG, and the transfer signal TGL are always in a low level state.

Incidentally, in the imaging device 10 such as a CMOS image sensor, for example, noise cancellation processing using correlated double sampling (CDS) is performed in order to remove noise during a reset operation of the pixel 20. For this CDS processing, for example, the reset level (P phase) and the data level (D phase) are read from the pixel 20 as described above.

According to the circuit operation of the pixel 20 described above, the pixel 20 can read a pixel signal from the low-sensitivity photodiode 21S and read a pixel signal from the high-sensitivity photodiode 21L. Therefore, the imaging device 10 in which the pixels 20 are disposed in a matrix form can construct a wide dynamic image by using a pixel signal of the photodiode 21L in an exposure environment in which the pixel signal of the high-sensitivity photodiode 21L is not saturated and using a pixel signal of the low-sensitivity photodiode 21S in an exposure environment in which the pixel signal of the high-sensitivity photodiode 21L is saturated.

The imaging device 10 according to the present embodiment described above is a sensor that includes the image processing unit 141 for imaging and the object recognition processing unit 142 as functional units of the image signal processing unit 14 and can acquire captured image information and object recognition information alone (that is, with one imaging device 10).

Here, when a case in which the imaging device 10 according to the present embodiment is mounted on, for example, a vehicle control system which will be described later and used is assumed, the imaging device 10 alone can detect and recognize an object around a host vehicle, for example, a pedestrian, an obstacle, a traffic light, a vehicle traveling before, behind or beside the host vehicle, or the like, as an event.

Although a system configuration in which the image processing unit 141 for imaging and the object recognition processing unit 142, which are examples of functional units of the image signal processing unit 14, are provided inside the imaging device main body 10A has been exemplified in the above-described embodiment, it is also possible to employ a system configuration in which the image processing unit 141 for imaging and the object recognition processing unit 142 are provided as, for example, processing units outside the imaging device main body 10A. In this case, the imaging device 10 according to the present embodiment can include the imaging device main body 10A, the image processing unit 141 for imaging and the object recognition processing unit 142 provided outside the imaging device main body 10A.

Hereinafter, a specific embodiment of a vehicle control system equipped with the imaging device 10 according to the embodiment of the present disclosure will be described.

Vehicle Control System According to First Embodiment of Present Disclosure

Figure 4:
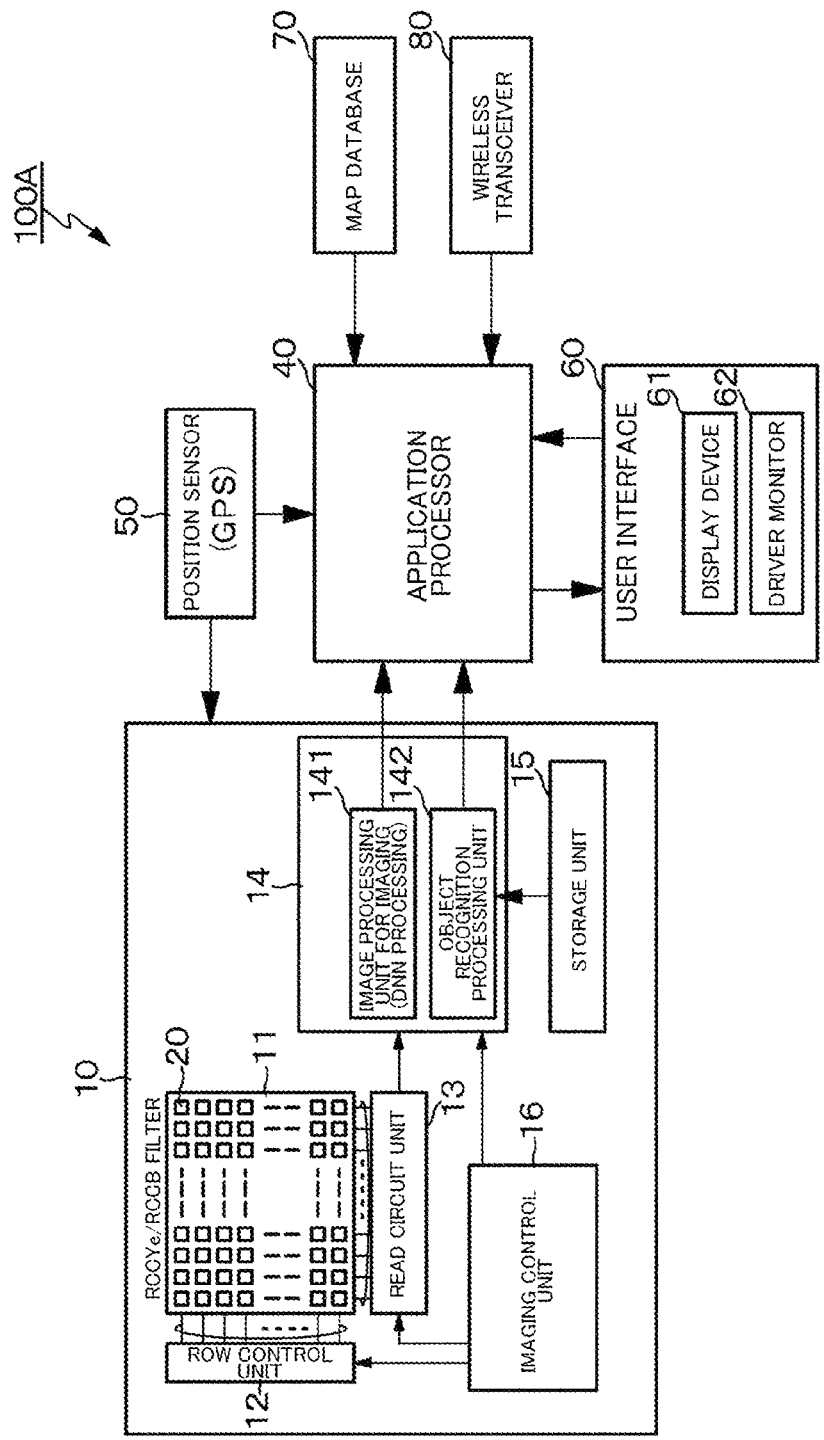
FIG. 4 is a block diagram showing an example of a system configuration of a vehicle control system according to a first embodiment of the present disclosure.

FIG. 4 is a block diagram showing an example of a system configuration of a vehicle control system according to a first embodiment of the present disclosure.

As shown in FIG. 4, the vehicle control system 100A according to the first embodiment uses the imaging device 10 according to the above-described embodiment of the present disclosure as an imaging device mounted on a vehicle to acquire information on the outside of the vehicle. The same applies to second to fourth embodiments which will be described later. The vehicle control system 100A according to the first embodiment includes an application processor 40, a position sensor 50, a user interface 60, a map database 70, a wireless transceiver 80, and the like in addition to the imaging device 10. The application processor 40 is an example of a signal processing unit that processes a signal after processing in the application processor 40.

Figure 5A:
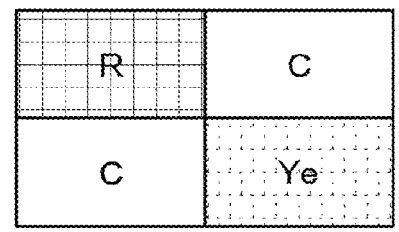
FIGS. 5A, 5B, and 5C are diagrams showing examples of color arrangement of a color filter array.
Figure 5B:
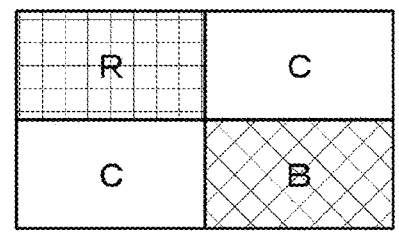

The imaging device 10 in the vehicle control system 100A according to the first embodiment is equipped with, for example, an RCCYe filter shown in FIG. 5A, an RCCB filter shown in FIG. 5B, or the like as a color filter array mainly used to acquire color data of video.

Here, R (Red) represents a filter that transmits light in the red wavelength region, C (Clear) represents a colorless filter, Ye (Yellow) represents a filter that transmits light in the yellow wavelength region, and B (Blue) represents a filter that transmits light in the blue wavelength region. However, the color filter array including the colorless (C) filter is not limited to the RCCYe filter and the RCCB filter, and may be an RCCC filter or the like.

The RCCYe filter shown in FIG. 5A and the RCCB filter shown in FIG. 5B include two colorless (C) filters and one red light (R) filter and thus have higher sensitivity and have advantages that it is possible to image distant obstacles, pedestrians, and the like even under low illuminance corresponding to a bright moonlit night and to discriminate a white front light, a red tail light, and the like of an automobile according to the intensity of red light.

Figure 5C:
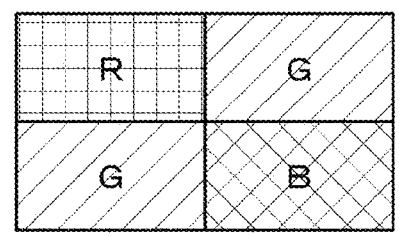

On the other hand, the RCCYe filter shown in FIG. 5A and the RCCB filter shown in FIG. 5B have lower color reproducibility than the RGB (G represents a filter that transmits light in the green wavelength range) Bayer array filter shown in FIG. 5C.

Therefore, the image processing unit 141 for imaging of the imaging device 10 performs image processing using a neural network (DNN) to which deep learning is applied for image processing. By performing image processing through DNN processing in the image processing unit 141 for imaging, it is possible to output a captured image with high color reproducibility. This captured image with high color reproducibility is displayed on a display device 61 of the user interface 60 under the control of the application processor 40.

As described above, the object recognition processing unit 142 of the imaging device 10 performs object recognition with respect to an object imaged by the imaging device 10 by comparing, for example, feature points of the object as teacher data with feature points of an object image captured by the imaging device 10 using DNN processing and outputs object recognition information. The object recognition information is supplied to the application processor 40 along with captured image information output from the image processing unit 141 for imaging.

The position sensor 50 is, for example, a global positioning system (GPS), measures the current location of the host vehicle, and calculates and obtains the longitude/latitude information of the current location. The position sensor 50 provides the longitude/latitude information of the current location obtained by calculation to the imaging device 10 and the application processor 40.

In addition to the longitude/latitude information of the current location provided by the position sensor 50, map information from the map database 70 and received information from the wireless transceiver 80 are provided to the application processor 40. The application processor 40 is also provided with information from a driver monitor 62 provided in the user interface 60. The driver monitor 62 is a device provided for watching over the driver and preventing the driver from falling asleep or looking aside.

For example, a dynamic map is stored in the map database 70. Here, the dynamic map is a digital map in which a huge amount of dynamic information and static information that change from moment to moment are combined. As dynamic information that changes from moment to moment, traffic regulation, construction information, accidents, traffic jams, pedestrians, signal information, and the like can be exemplified. As static information, highly accurate three-dimensional position information, for example, road surface information, lane information, three-dimensional structure, and the like can be exemplified.

By using the dynamic map for the automatic driving of the vehicle control system 100A, the application processor 40 can recognize curves present on the way and ups and downs of roads in advance. Accordingly, in automatic driving, it is possible to accelerate/decelerate automobiles with a margin and operate the steering wheel at an appropriate timing depending on a situation recognized in advance.

According to the vehicle control system 100A according to the first embodiment having the aforementioned configuration, the RCCYe filter or the RCCB filter having lower color reproducibility than that of an RGB Bayer array filter is provided as a color filter array, but a captured image with high color reproducibility can be output by performing image processing according to DNN processing. Moreover, since the RCCYe filter and the RCCB filter include a C filter and an R filter, they have high sensitivity and can image distant obstacles, pedestrians, and the like even in low illuminance and discriminate a white front light, a red tail light, and the like of an automobile depending on the intensity of red light.

Vehicle Control System According to Second Embodiment of Present Disclosure

Figure 6:
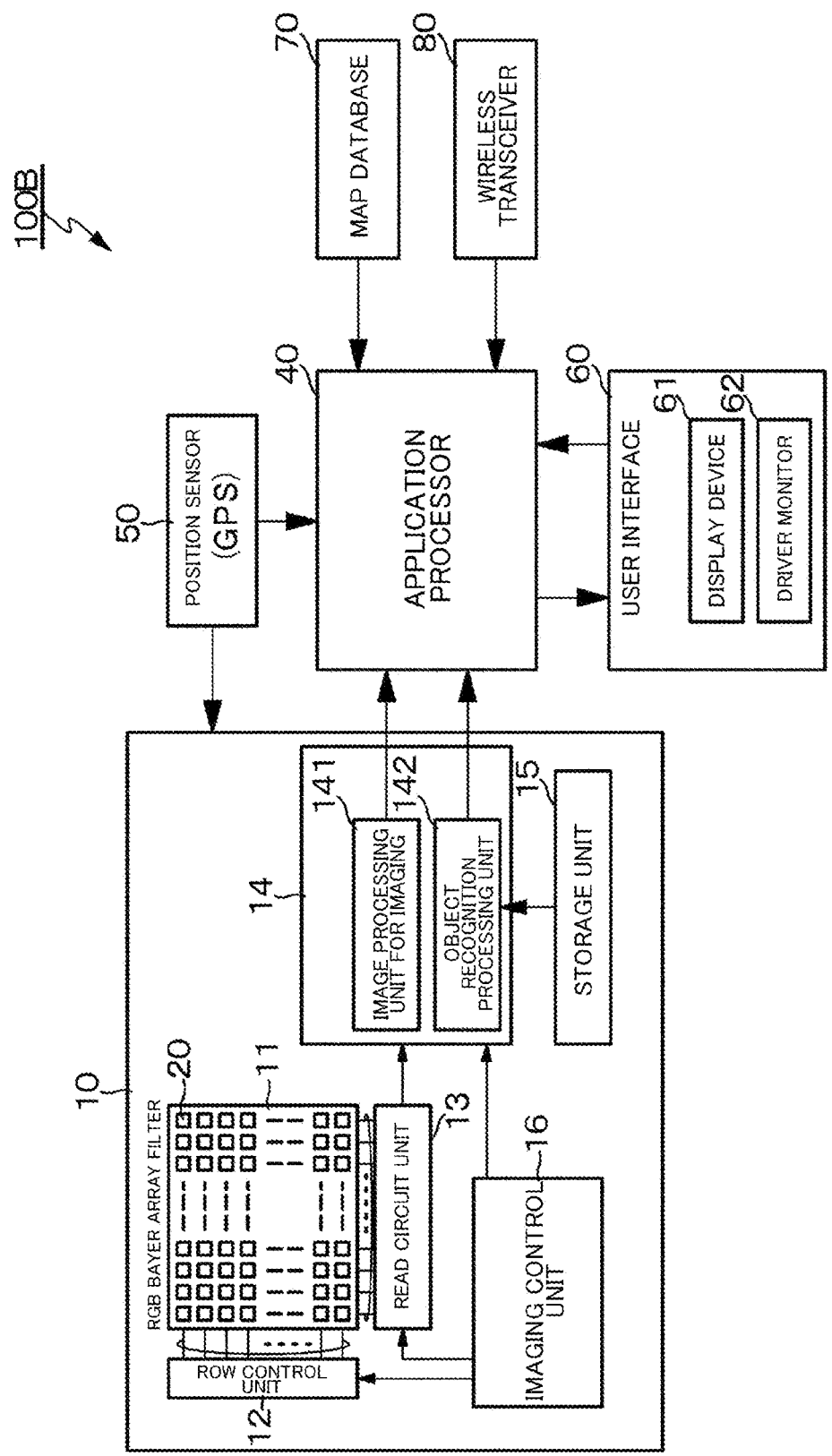
FIG. 6 is a block diagram showing an example of a system configuration of a vehicle control system according to a second embodiment of the present disclosure.

FIG. 6 is a block diagram showing an example of a system configuration of a vehicle control system according to a second embodiment of the present disclosure.

The imaging device 10 in the vehicle control system 100B according to the second embodiment is equipped with, for example, an RGB Bayer array filter shown in FIG. 5C as a color filter array. The RGB Bayer array filter is superior in color reproducibility to the RCCYe filter shown in FIG. 5A and the RCCB filter shown in FIG. 5B. Therefore, it is not necessary to use DNN processing as image processing of the image processing unit 141 for imaging of the imaging device 10, and it is possible to use the same image processing as that of a general imaging device.

According to the vehicle control system 100B according to the second embodiment having the above-described configuration, although the sensitivity decreases as compared to a case in which the RCCYe filter, the RCCB filter or the like is mounted because the RGB Bayer array filter is mounted as a color filter array, the configuration of the image processing unit 141 for imaging can be simplified because it is not necessary to perform image processing through DNN processing.

Vehicle Control System According to Third Embodiment of Present Disclosure

Figure 7:
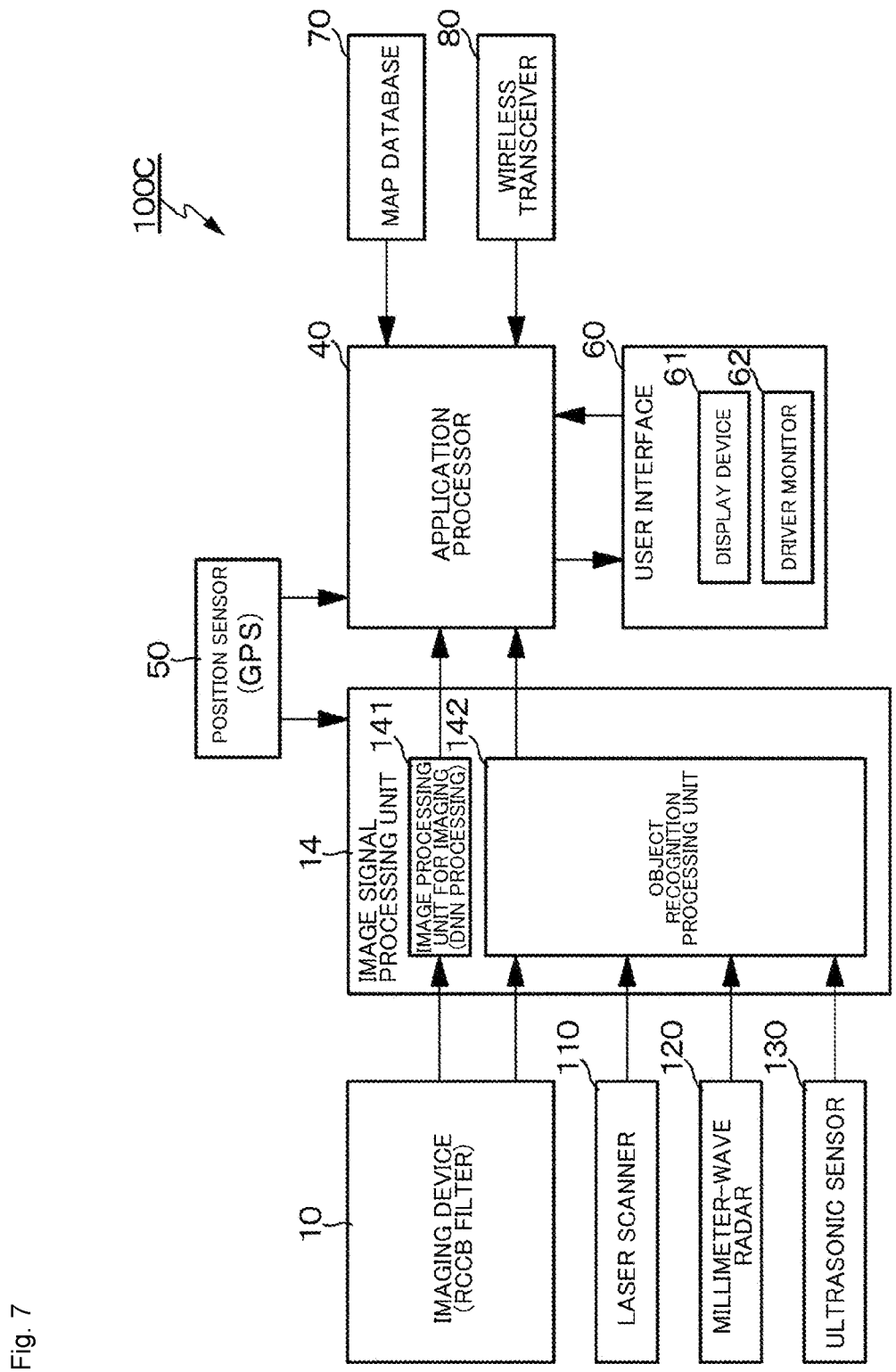
FIG. 7 is a block diagram showing an example of a system configuration of a vehicle control system according to a third embodiment of the present disclosure.

FIG. 7 is a block diagram showing an example of a system configuration of a vehicle control system according to a third embodiment of the present disclosure.

As shown in FIG. 7, the vehicle control system 100C according to the third embodiment has a system configuration in which the image signal processing unit 14 including the image processing unit 141 for imaging and the object recognition processing unit 142 is provided outside the imaging device 100 as a processing unit. However, as in the case of the vehicle control system 100A according to the first embodiment, a system configuration in which the image signal processing unit 14 including the image processing unit 141 for imaging and the object recognition processing unit 142 is included in the imaging device 10 may also be employed.

The vehicle control system 100C according to the third embodiment is equipped with, for example, the RCCB filter shown in FIG. 5B as a color filter array. As described above, the RCCB filter shown in FIG. 5B has lower color reproducibility than that of the RGB Bayer array filter shown in FIG. 5C. Therefore, as in the case of the vehicle control system 100A according to the first embodiment, the vehicle control system 100C according to the third embodiment can output an image with higher color reproducibility by using DNN processing as image processing of the image processing unit 141 for imaging.

In the vehicle control system 100C according to the third embodiment, the application processor 40, which is an example of a signal processing unit, acquires information on a distance between the host vehicle equipped with the imaging device 10 and an object (for example, another vehicle) around the host vehicle on the basis of object recognition information acquired by the object recognition processing unit 142. Then, when the distance between the host vehicle and the object around the host vehicle is less than a predetermined threshold value, the application processor 40 determines that the host vehicle is in a dangerous driving state and acquires captured image information through the image processing unit 141 for imaging.

The vehicle control system 100C according to the third embodiment includes a laser scanner 110, a millimeter-wave radar 120, and an ultrasonic sensor 130 as sensors for detecting information on surroundings of the host vehicle in addition to the imaging device 10. Although a system configuration including all of the laser scanner 110, the millimeter-wave radar 120, and the ultrasonic sensor 130 is illustrated here, a system configuration including at least one of the laser scanner 110, the millimeter-wave radar 120, and the ultrasonic sensor 130 may be employed.

As the laser scanner 110, for example, a lidar (Light Detection and Ranging, Laser Imaging Detection and Ranging) device can be used. The lidar device is a sensor that measures scattered light for laser radiation that emits pulsed light and particularly measures a distance to an object present at a long distance.

The millimeter-wave radar 120 is a sensor that detects position information such as a distance to a measurement target and a horizontal angle and a relative velocity using radio waves having a short wavelength. The ultrasonic sensor 130 is a sensor that measures a distance to an object using reflection of ultrasonic waves.

According to the vehicle control system 100C according to the third embodiment, which includes the laser scanner 110, the millimeter-wave radar 120, and the ultrasonic sensor 130 as sensors for detecting information on the surroundings of the host vehicle in addition to the imaging device 10, more surrounding information can be acquired and thus detection accuracy and recognition accuracy of an object can be improved as compared to a case where only the imaging device 10 is used.

According to the vehicle control system 100C according to the third embodiment having the aforementioned configuration, although the RCCB filter having lower color reproducibility than that of the RGB Bayer array filter is mounted as a color filter array, a captured image with high color reproducibility can be output by performing image processing according to DNN processing. Moreover, it is possible to image distant obstacles, pedestrians, and the like with high sensitivity even under low illumination and to discriminate a white front light, a red tail light, and the like of an automobile by mounting the RCCB filter. Further, it is possible to improve recognition accuracy of an object by including the laser scanner 110, the millimeter-wave radar 120, and the ultrasonic sensor 130 in addition to the imaging device 10 to acquire more surrounding information, and thus safer and more reliable vehicle control can be performed.

Vehicle Control System According to Fourth Embodiment of Present Disclosure

Figure 8:
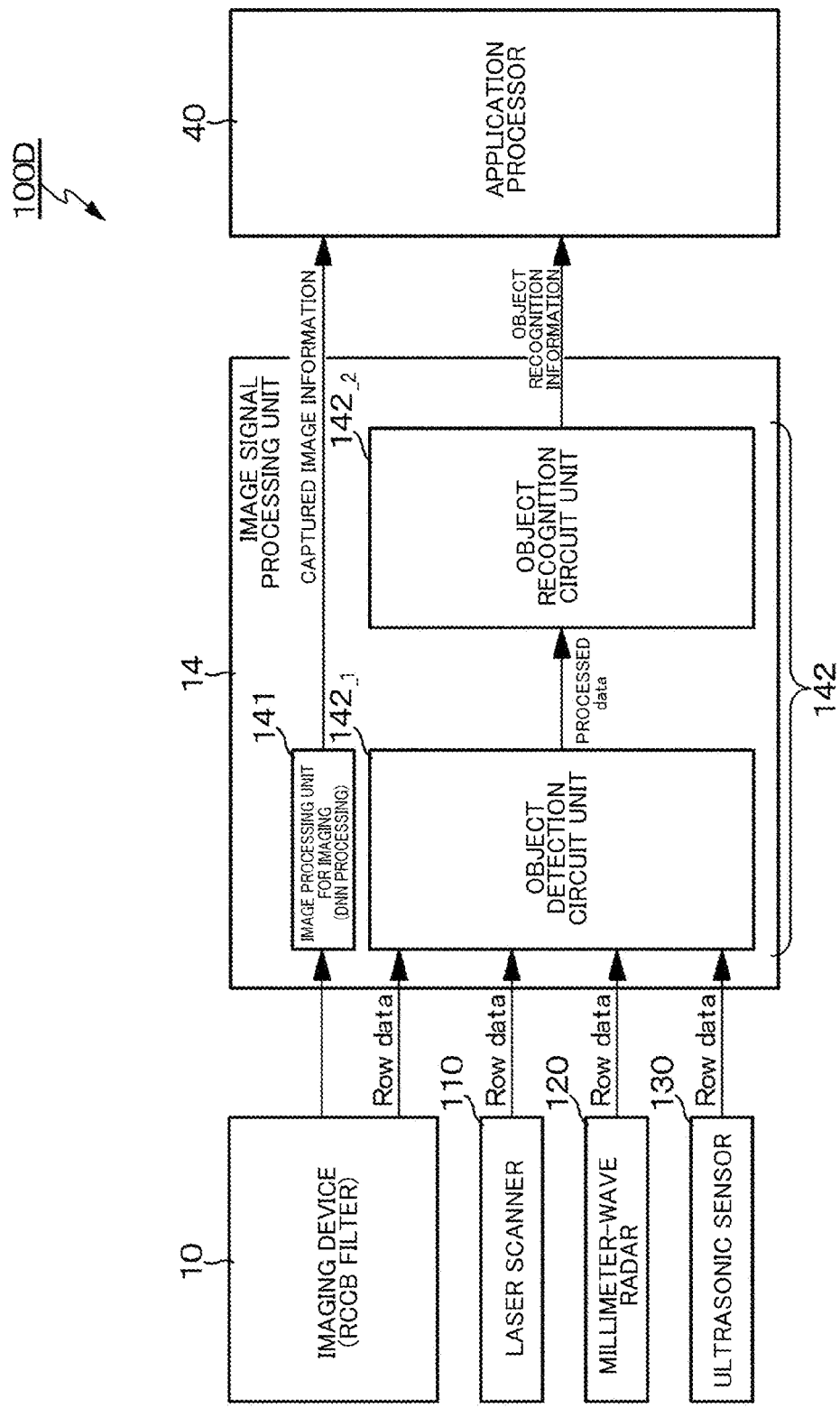
FIG. 8 is a block diagram showing an example of a system configuration of a vehicle control system according to a fourth embodiment of the present disclosure.

FIG. 8 is a block diagram showing an example of a system configuration of a vehicle control system according to a fourth embodiment of the present disclosure.

As in the case of the vehicle control system 100C according to the third embodiment, the vehicle control system 100D according to the fourth embodiment also has a system configuration in which the signal processing unit 14 including the image processing unit 141 for imaging and the object recognition processing unit 142 is provided outside the imaging device 100 as a processing unit. However, as in the case of the vehicle control system 100A according to the first embodiment, a system configuration in which the image signal processing unit 14 including the image processing unit 141 for imaging and the object recognition processing unit 142 is included in the imaging device 10 may also be employed.

Further, the vehicle control system 100C according to the third embodiment also has, for example, the RCCB filter shown in FIG. 5B as a color filter array. The imaging device 10 may be provided with an image processing unit that performs preprocessing such as flicker suppression processing on an image signal sent to the external image processing unit 141 for imaging. Preprocessing may be signal processing using deep learning.

Further, the vehicle control system 100D according to the fourth embodiment is the same as the vehicle control system 100C according to the third embodiment in that the former includes the laser scanner 110, the millimeter-wave radar 120, and the ultrasonic sensor 130 as sensors for detecting information on the surroundings of the host vehicle in addition to the imaging device 10. However, the vehicle control system 100D according to the fourth embodiment differs from the vehicle control system 100C according to the third embodiment in that raw data before being processed, that is, analog data, is input to the image signal processing unit 14 from the imaging device 10, the laser scanner 110, the millimeter-wave radar 120, and the ultrasonic sensor 130 in the former case, whereas data on which processing has been performed is input in the latter case.

Although a system configuration in which the vehicle control system 100D according to the fourth embodiment includes all of the laser scanner 110, the millimeter-wave radar 120, and the ultrasonic sensor 130 is illustrated, a system configuration in which the vehicle control system 100D includes at least one of the laser scanner 110, the millimeter-wave radar 120, and the ultrasonic sensors 130 may be employed.

In the image signal processing unit 14, the image processing unit 141 for imaging improves color reproducibility by performing image processing according to DNN processing on an imaging signal from the imaging device 10 through the RCCB filter and then outputs the imaging signal to the application processor 40 as captured image information.

The object recognition processing unit 142 in the vehicle control system 100D according to the fourth embodiment includes an object detection circuit unit 142$_{-1}$ that is a previous-stage circuit unit and an object recognition circuit unit 142$_{-2}$ that is a subsequent-stage circuit unit.

The object detection circuit unit 142$_{-1}$ in the previous stage receives analog data from the imaging device 10, the laser scanner 110, the millimeter-wave radar 120, and the ultrasonic sensor 130 as inputs, detects an object according to DNN processing on the basis of the analog data, and supplies data indicating that the object has been detected to the object recognition circuit unit 142$_{-2}$ in the subsequent stage as processed data.

The object recognition circuit unit 142$_{-2}$ in the subsequent stage performs object recognition on the object detected by the object detection circuit unit 142$_{-1}$ in the previous stage according to DNN processing and outputs the recognition result to the application processor 40 as object recognition information.

In the vehicle control system 100D according to the fourth embodiment, the object recognition processing unit 142 acquires information on a distance between the host vehicle and an object (e.g., another vehicle) around the host vehicle on the basis of a signal input from at least one of the laser scanner 110, the millimeter-wave radar 120, and the ultrasonic sensor 130.

The application processor 40 that is an example of a signal processing unit determines a case in which the distance between the host vehicle and the object around the host vehicle is less than a predetermined threshold value as a dangerous driving state and acquires captured image information through the image processing unit 141 for imaging. Further, the application processor 40 determines a case in which the distance between the host vehicle and the object around the host vehicle is less than the predetermined threshold value as a dangerous driving state, acquires a captured image through the image processing unit 141 for imaging, and performs, for example, processing of storing the captured image in a built-in storage unit.

As described above, in the vehicle control system 100D according to the fourth embodiment, presence or absence of an object is detected by the object detection circuit unit 142$_{-1}$ using raw data, that is, analog data, and then if an object is present, the object recognition circuit unit 142$_{-2}$ performs processing of recognizing the object. In this manner, by performing object detection on the basis of analog data first, object detection and object recognition can be performed earlier than a case in which object detection is performed on the basis of processed data (for example, digital data). As a result, object recognition results can be reflected in vehicle control more rapidly.

The vehicle control system 100A according to the first embodiment, the vehicle control system 100B according to the second embodiment, the vehicle control system 100C according to the third embodiment, or the vehicle control system 100D according to the fourth embodiment described above can be used as an example of a vehicle control system 7000 (refer to FIG. 16) which will be described later. In addition, in applying to the vehicle control system 7000 which will be described later, the imaging device 10 is installed at predetermined positions of a vehicle 7900 and used as imaging units 7910, 7912, 7914, 7916, and 7918, and the laser scanner 110, the millimeter-wave radar 120, and the ultrasonic sensor 130 are installed at installed at predetermined positions of the vehicle 7900 and used as vehicle external information detection units 7920, 7922, 7924, 7926, 7928, and 7930, as shown in FIG. 17.

Hereinafter, specific examples of system control in the vehicle control system 100D according to the fourth embodiment including the laser scanner 110, the millimeter-wave radar 120, and the ultrasonic sensor 130 in addition to the imaging device 10 will be described. In the following, it is assumed that the imaging device 10 according to the above-described embodiment, which is installed at predetermined positions of the vehicle 7900 as imaging units 7910, 7912, 7914, 7916, and 7918, is simply referred to as a "camera" for simplification of description.

Example 1

Example 1 is a control example of a vehicle control system during automatic driving. Control of automatic driving is executed under the control of a drive system control unit 7100 (refer to FIG. 16) which will be described later.

Figure 9:
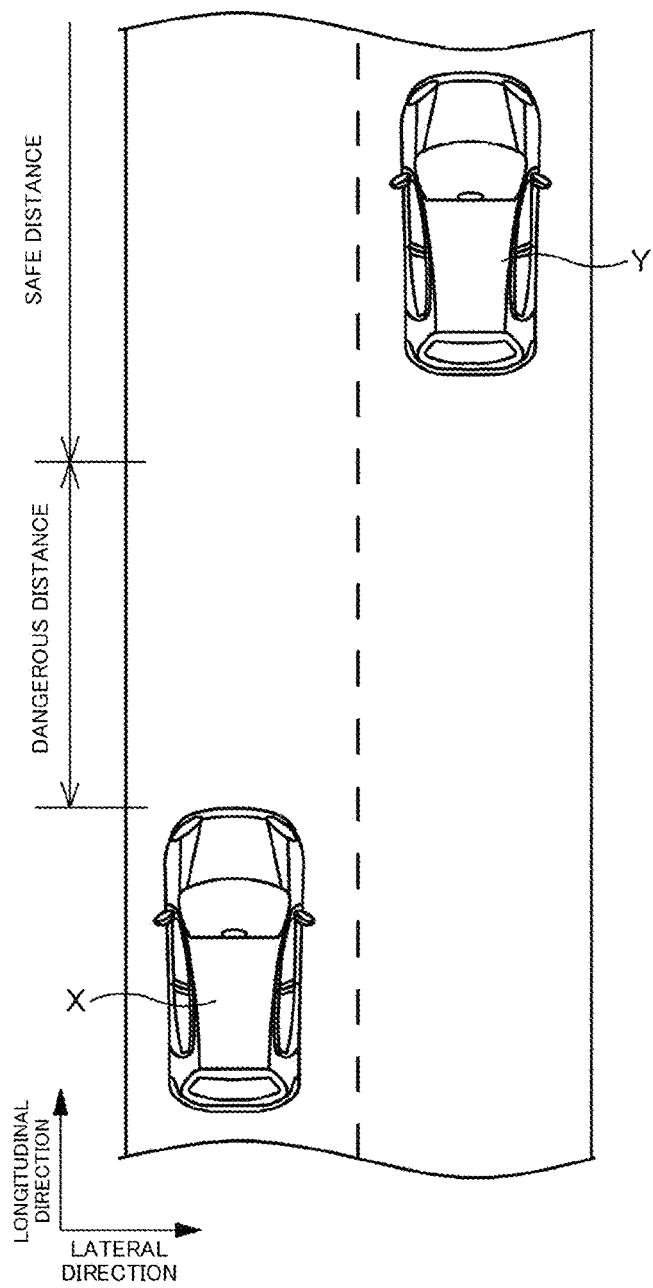
FIG. 9 is a schematic diagram showing an example of a safe driving state.

FIG. 9 shows an example of a safe driving state. The safe driving state exemplified here is a driving state in which another vehicle Y is traveling in a lane next to a lane in which a host vehicle X is traveling in front of the host vehicle X at a distance of more than a dangerous distance, and safe distances are secured in the lateral direction and the longitudinal direction (driving direction). In such a driving state, only the object recognition processing unit 142 is started to only perform recognition, so-called sensing, of an object around the host vehicle X. However, it is also possible to display an image captured by an arbitrary camera installed in the host vehicle X on a display in the vehicle on the basis of an operation of a user (driver).

In a full automatic driving system, imaging (imaging) by the imaging device 10 may not be necessary, and thus it can be used as a substitute for saving in a drive recorder for occurrence of an accident, for example, and may be carried out at the same time as display according to imaging, or they may be carried out alternately.

Figure 10:
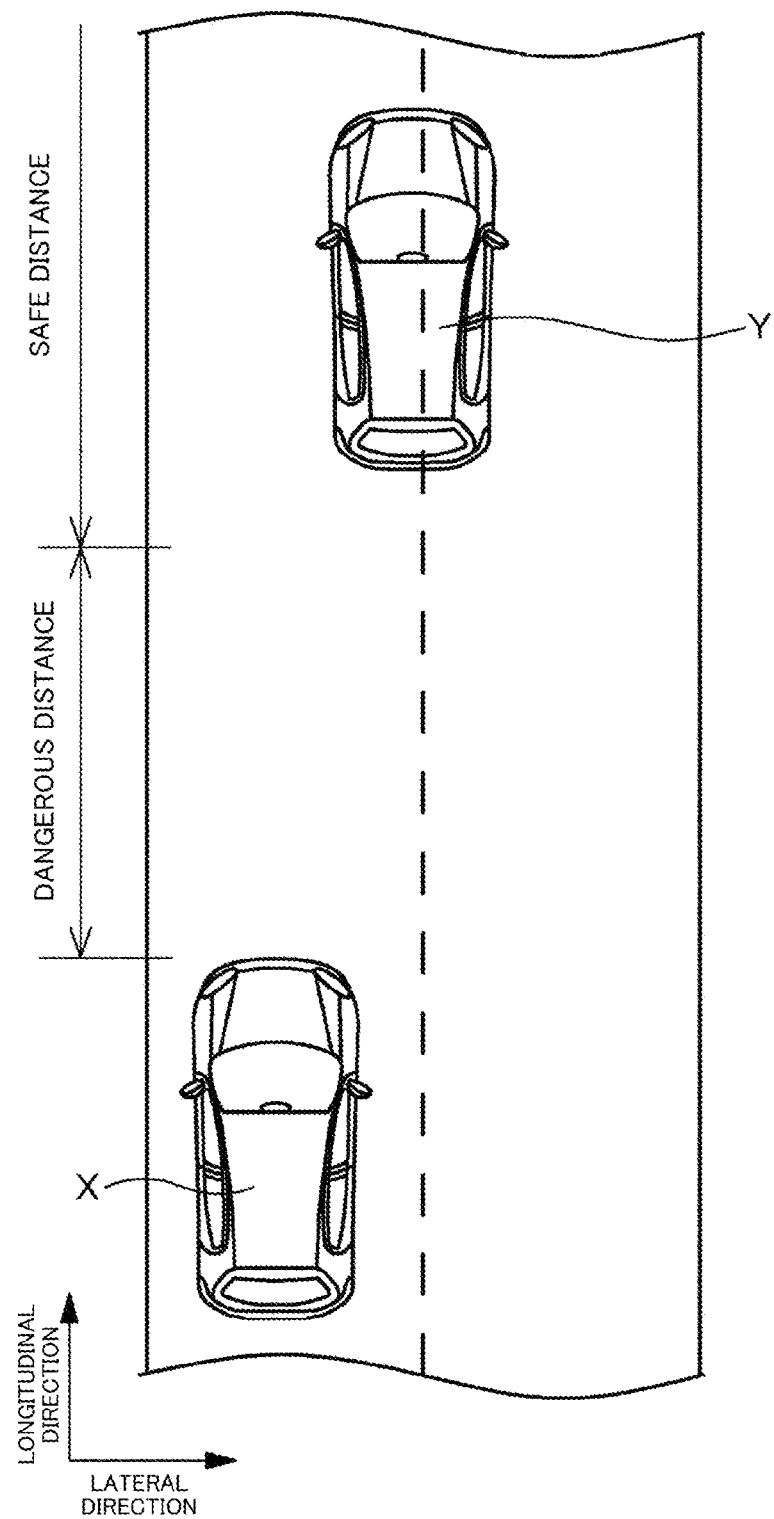
FIG. 10 is a schematic diagram showing a specific example (1) of a dangerous driving state.
Figure 11:
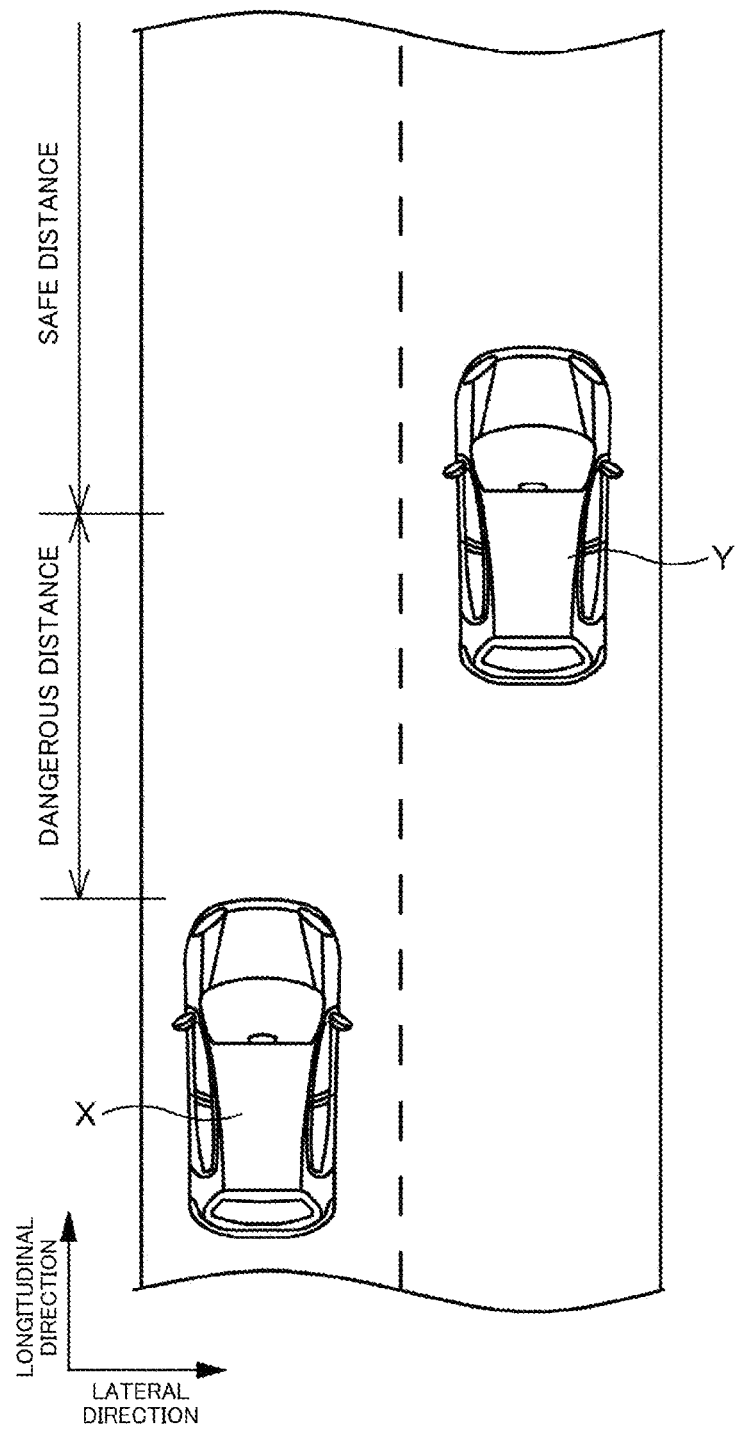
FIG. 11 is a schematic diagram showing a specific example (2) of a dangerous driving state.
Figure 12:
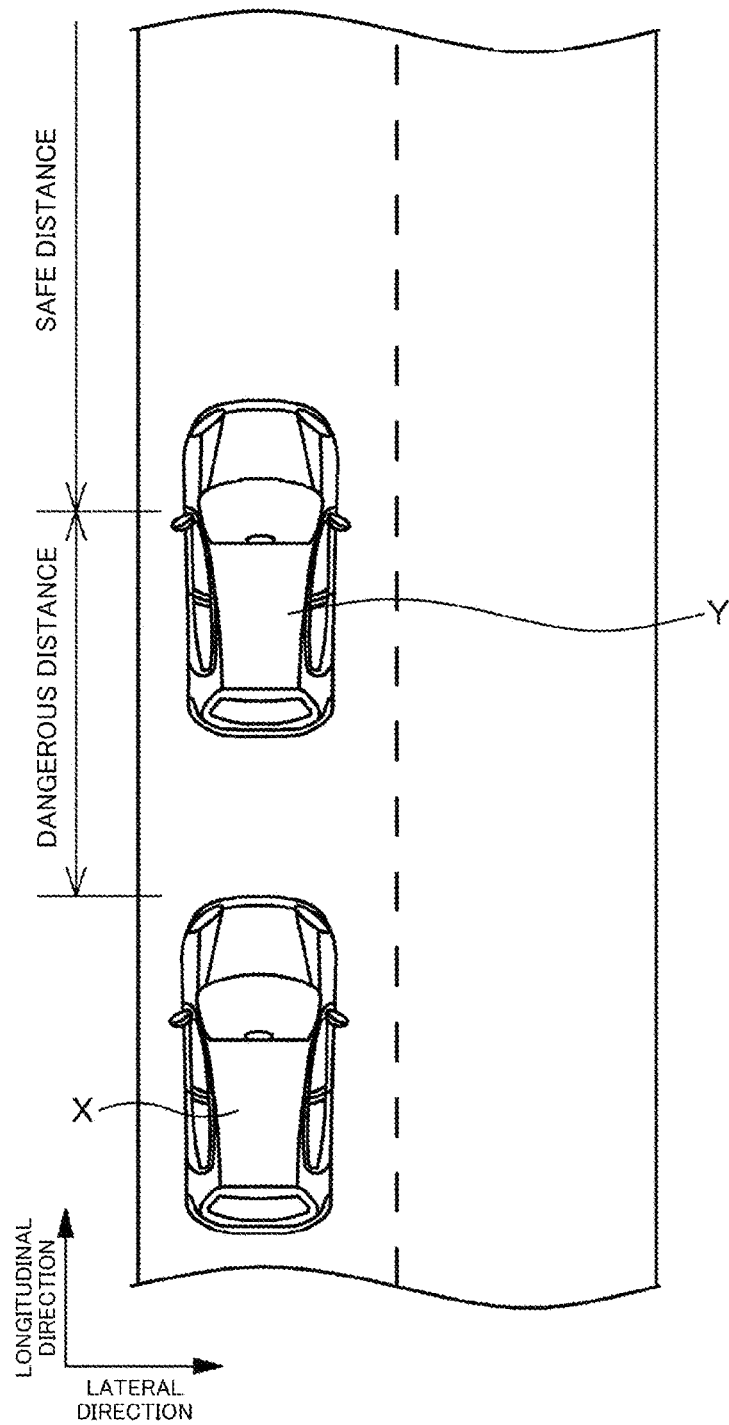
FIG. 12 is a schematic diagram showing a specific example (3) of a dangerous driving state.

Specific examples (1, 2, and 3) of a dangerous driving state are shown in FIG. 10, FIG. 11, and FIG. 12.

The dangerous driving state shown in FIG. 10 is a driving state in which the other vehicle Y is traveling across the lane next to the lane in which the host vehicle X is traveling, and in particular, a safe distance is not secured in the lateral direction. The dangerous driving state shown in FIG. 11 is a driving state in which the other vehicle Y is traveling within a dangerous distance of the next lane, and an accident may occur when the other vehicle Y changes lanes. The dangerous driving state shown in FIG. 12 is a driving state in which the other vehicle Y is traveling within a dangerous distance of the lane in which the host vehicle X is traveling, and a safe distance is not secured in both the lateral and longitudinal directions.

In the case of the above-mentioned dangerous driving states, that is, the distance to the other vehicle Y in the lateral direction and/or the longitudinal direction (driving direction) is dangerous, for example, imaging processing of a camera provided in front of the vehicle is started and imaging by the image processing unit 141 for imaging and the sensing by the object recognition processing unit 142 are performed. Then, a captured image is displayed on the display in the vehicle.

Regarding sensing of the surrounding environment of a vehicle, constant sensing is performed by a sensing system using a camera (that is, the imaging device 10) as shown in FIG. 6. Further, it is possible to constantly sense the surrounding environment of the vehicle by a fusion system according to a plurality of sensors such as the laser scanner 110, the millimeter-wave radar 120, and the ultrasonic sensor 130 as shown in FIG. 7. In addition, by this sensing, a distance between the host vehicle X and an object (e.g., another vehicle Y) around the host vehicle X is sensed, and the application processor 40 that is an example of a signal processing unit determines whether the distance is dangerous or safe.

Further, control is performed such that a distance from the other vehicle Y in the lateral direction is maintained as a safe distance or control is performed such that a safe distance is maintained in a driving direction on the basis of measurement results of the laser scanner 110, the millimeter-wave radar 120, the ultrasonic sensor 130, and the like. At this time, it is also possible to display a warning on the display in the vehicle or switch from automatic driving to driving by the driver.

Example 2

Figure 13:
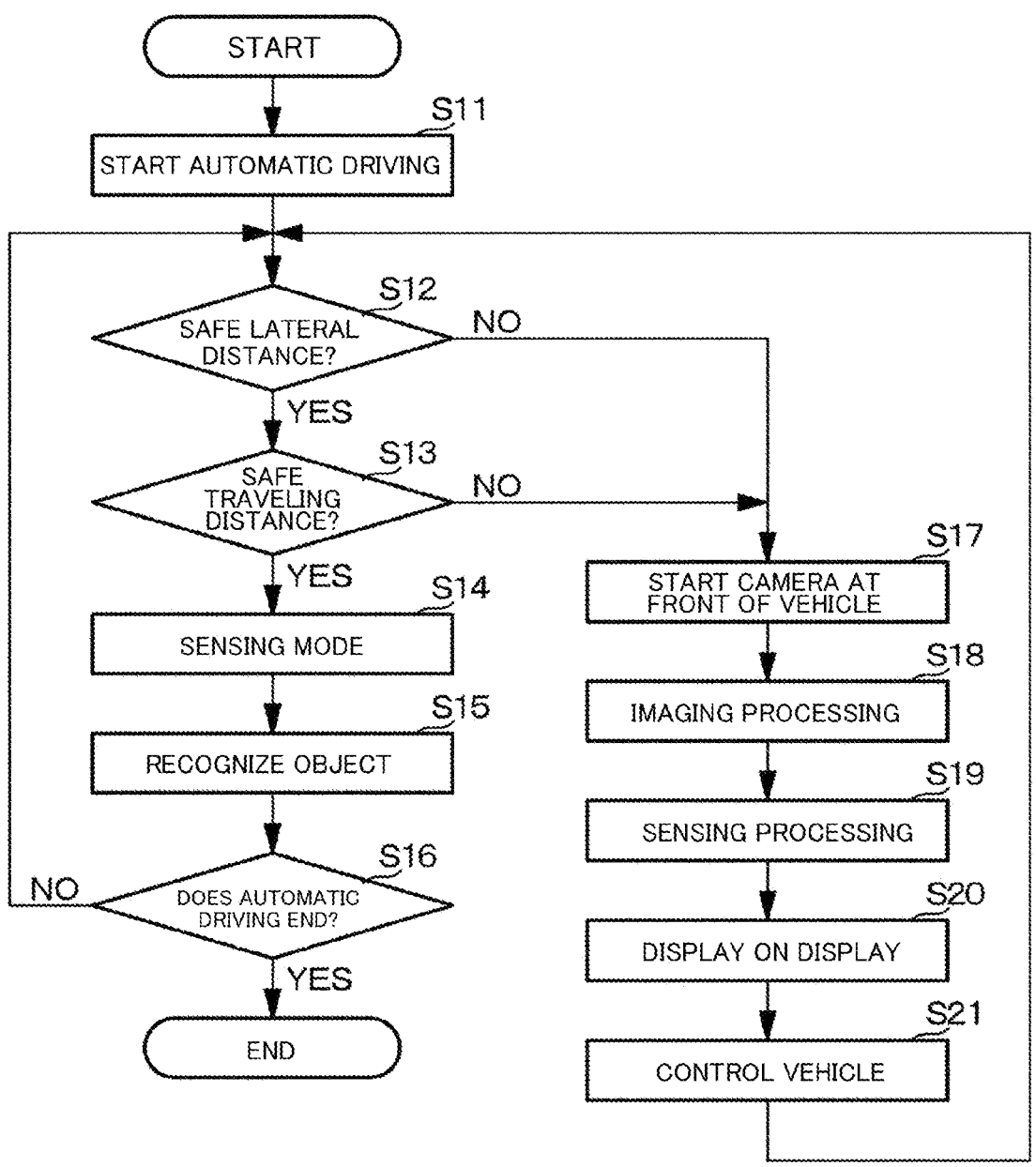
FIG. 13 is a flowchart showing an example of a series of control procedures of a vehicle control system during automatic driving.

Example 2 is a series of control procedures of the vehicle control system during automatic driving. A series of control procedures (control method) of the vehicle control system in the aforementioned safe driving state and dangerous driving state will be described with reference to the flowchart of FIG. 13. It is assumed that a series of controls exemplified here is executed under the control of the drive system control unit 7100 (hereinafter, simply referred to as a "control unit") which will be described later. The control unit corresponds to the application processor 40 that is an example of a signal processing unit.

The control unit starts automatic driving (step S11), determines whether a safe distance is maintained in the lateral direction (step S12), and then determines whether a safe distance is maintained in the longitudinal direction (driving direction) (step S13). If safe distances are maintained in the lateral and longitudinal directions (YES in S12 and YES in S13), the control unit starts only the object recognition processing unit 142 to set a sensing mode (step S14) and recognizes an object around the host vehicle X (step S15).

Next, the control unit determines whether or not automatic driving ends (step S16), ends the series of controls of the vehicle control system during automatic driving if automatic driving ends (YES in S16), and returns to step S12 if automatic driving does not end (NO in S16).

If the lateral distance between the host vehicle X and the other vehicle Y is less than a predetermined threshold value in step S12, the control unit determines that a safe distance is not maintained in the lateral direction and the host vehicle X is in a dangerous state (NO in S12). Further, if the longitudinal distance between the host vehicle X and the other vehicle Y is less than a predetermined threshold value in step S13, the control unit determines that a safe distance is not maintained in the longitudinal direction and the host vehicle is in a dangerous state (NO in S13).

When it is determined that the current state is a dangerous state (NO in S12/NO in S13), the control unit starts a camera (for example, a camera installed at the front of the vehicle) that images a vehicle for which a safe distance is not maintained (step S17). Then, the control unit performs imaging processing by the image processing unit 141 for imaging (step S18), and then performs sensing processing by the object recognition processing unit 142 (step S19).

Next, the control unit displays a captured image on the display in the vehicle (step S20), and then performs vehicle control on the basis of sensing results of the object recognition processing unit 142 and measurement results of the laser scanner 110, the millimeter-wave radar 120, the ultrasonic sensor 130 or the like (step S21). In this vehicle control, control is performed such that the lateral distance from the other vehicle Y is maintained as a safe distance, or control is performed such that a safe distance is maintained in the longitudinal direction. After vehicle control, processing returns to step S12.

Example 3

Example 3 is a control example in a place where a plurality of cars or objects are present, such as a parking area.

Figure 14:
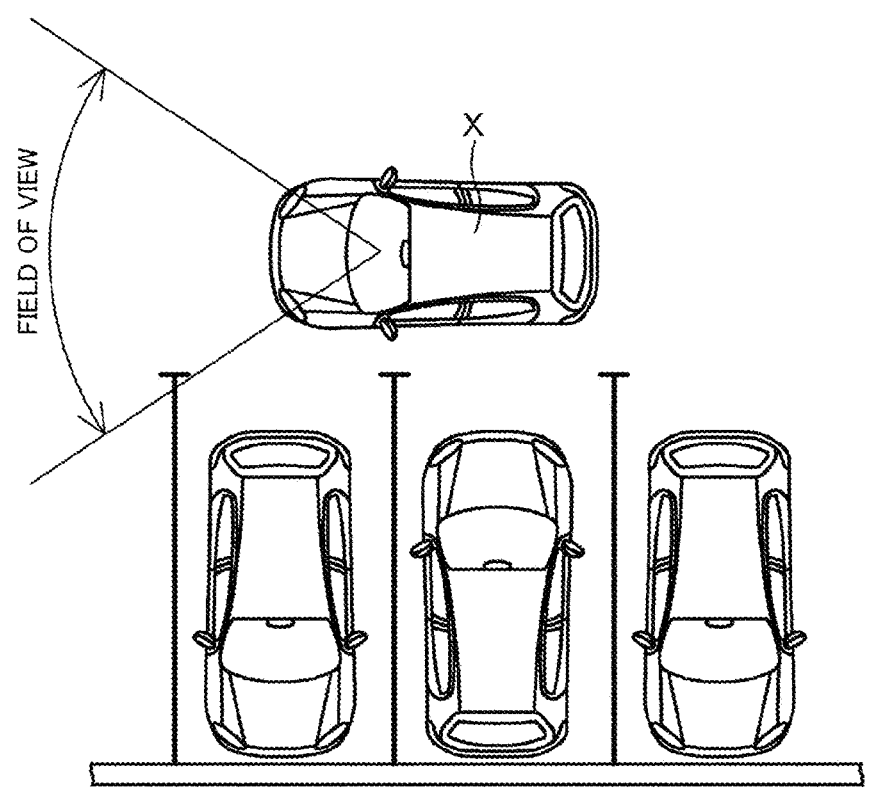
FIG. 14 is a bird's-eye view image of a state when a vehicle enters a place where a plurality of vehicles or objects are present, viewed from above a host vehicle.

As shown in FIG. 14, when the laser scanner 110, the millimeter-wave radar 120, the ultrasonic sensor 130, or the like detects that a vehicle (host vehicle x) has entered a place where a plurality of vehicles or objects are present, such as a parking area, cameras installed on the front, rear, side, and the like of the vehicle are started to perform object recognition. Further, imaging is performed on the basis of signals from those cameras and a bird's-eye view image seen from above the host vehicle x is displayed on the display in the vehicle by a surround view system.

It is possible to assist an operation of a driver during parking or detect pedestrians and obstacles and notify the driver of detected results by displaying a bird's-eye view image on the display in the vehicle.

Example 4

Figure 15A:
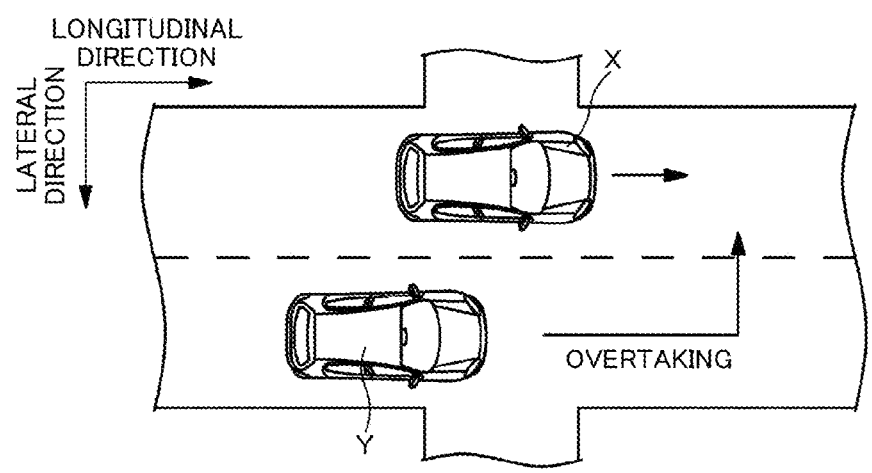
FIG. 15A is a schematic diagram showing a positional relationship between a host vehicle and a neighboring vehicle when the host vehicle is overtaken by the neighboring vehicle.

Example 4 is a control example when the host vehicle is overtaken by a neighboring vehicle. FIG. 15A shows a positional relationship between the host vehicle X and the neighboring vehicle Y when the host vehicle X is overtaken by the neighboring vehicle Y.

When the imaging device 10, the laser scanner 110, the millimeter-wave radar 120, the ultrasonic sensor 130, or the like detects that the neighboring vehicle Y overtakes the host vehicle X, imaging is performed through a camera installed on a side of the vehicle and a captured image is displayed on the display in the vehicle. Then, when the neighboring vehicle Y has entered the angle of view of the front camera of the vehicle, the image displayed on the display is gradually switched to an image captured by the front camera. Thereafter, upon determining that a safe distance is maintained between the host vehicle X and the preceding vehicle Y that has overtaken the host vehicle X, imaging is ended.

Further, when an unsafe distance from the neighboring vehicle Y is detected in the lateral direction as well as overtaking of the host vehicle X by the neighboring vehicle Y, imaging through cameras installed on the sides and the like of the vehicle may be started.

Example 5

Figure 15B:
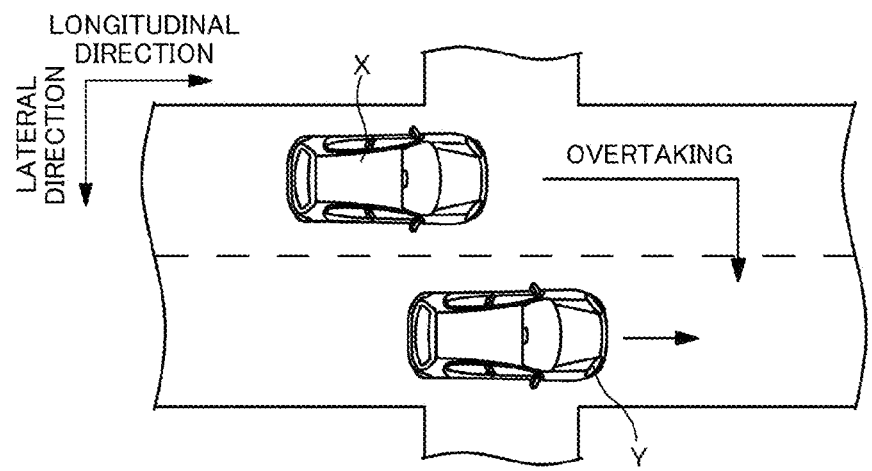
FIG. 15B is a schematic diagram showing a positional relationship between the two vehicles when the host vehicle overtakes the neighboring vehicle.

Example 5 is a control example when the host vehicle overtakes a neighboring vehicle. FIG. 15B shows a positional relationship between the host vehicle X and the neighboring vehicle Y when the host vehicle X overtakes the neighboring vehicle Y.

When the host vehicle X decides to overtake the neighboring vehicle Y, imaging is performed by a camera installed on a side of the vehicle, and a captured image is displayed on the display in the vehicle. Then, when the neighboring vehicle Y has entered the angle of view of the camera installed at the rear of the vehicle, an image displayed on the display is gradually switched to an image captured by the rear camera. Thereafter, when a safe distance is maintained between the host vehicle X and the overtaken vehicle Y behind the host vehicle X, imaging is ended.

Further, when an unsafe distance from the neighboring vehicle Y is detected in the lateral direction as well as overtaking of the neighboring vehicle Y by the host vehicle X, imaging through cameras installed on the sides and the like of the vehicle may be started.

Modified Example

Although the technology according to the present disclosure has been described above on the basis of preferred embodiments, the technology according to the present disclosure is not limited to the embodiments. The configurations and structures of the light receiving device and the distance measuring device described in the above embodiments are examples and can be modified as appropriate.

Application Examples of Technology According to Present Disclosure

The technology according to the present disclosure can be applied to various products. More specific application examples will be described below. For example, the technology according to the present disclosure may be realized as a distance measuring device mounted on any kind of moving body such as an automobile, an electric vehicle, a hybrid electric vehicle, a motorcycle, a bicycle, a personal mobility, an airplane, a drone, a ship, a robot, a construction machine, and an agricultural machine (tractor).

[Moving Body]

Figure 16:
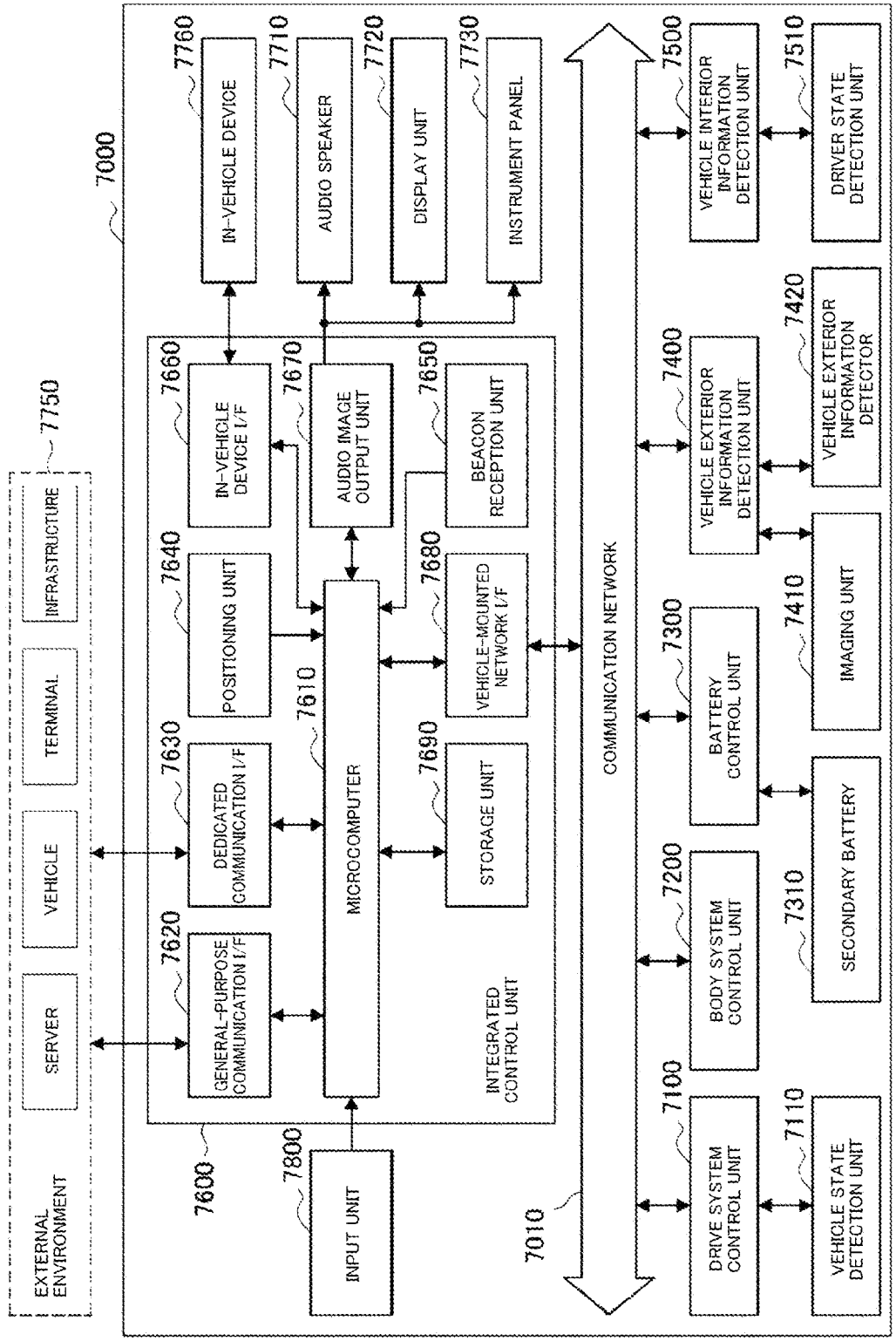
FIG. 16 is a block diagram showing a schematic configuration example of a vehicle control system, which is an example of a moving body control system to which the technology according to the present disclosure can be applied.
Figure 17:
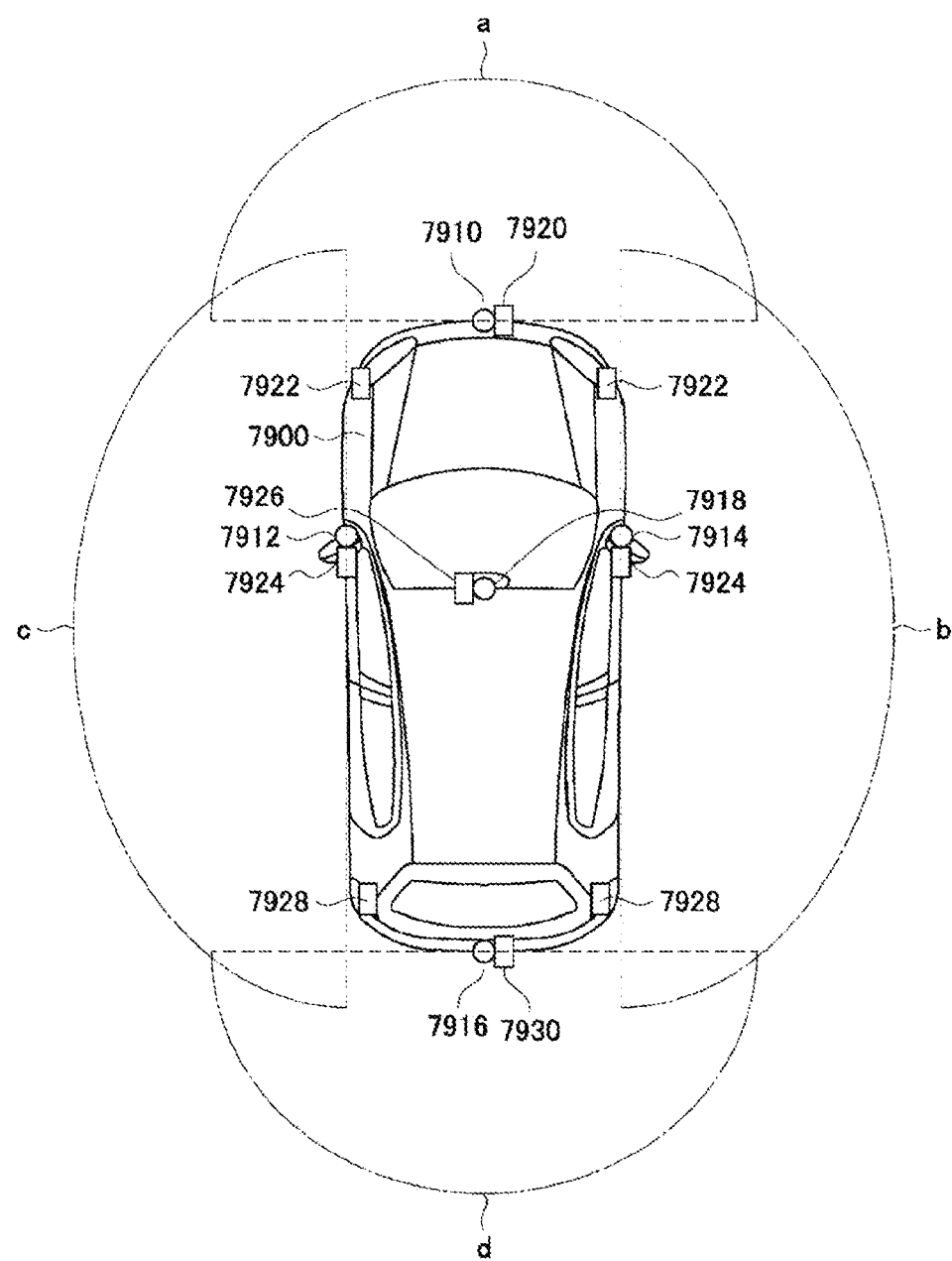
FIG. 17 is a diagram showing an example of installation positions of imaging units.

FIG. 16 is a block diagram illustrating a schematic configuration example of a vehicle control system 7000 which is an example of a moving body control system to which the technology according to the present disclosure can be applied. The vehicle control system 7000 includes a plurality of electronic control units connected via a communication network 7010. In the example shown in FIG. 16, the vehicle control system 7000 includes a drive system control unit 7100, a body system control unit 7200, a battery control unit 7300, a vehicle exterior information detection unit 7400, a vehicle interior information detection unit 7500, and an integrated control unit 7600. The communication network 7010 for connecting these plurality of control units may be an onboard communication network based on any standard such as a controller area network (CAN), a local interconnect network (LIN), a local area network (LAN), or FlexRay (registered trademark).

Each control unit includes a microcomputer that performs arithmetic processing according to various programs, a storage unit that stores programs executed by the microcomputer, parameters used for various arithmetic operations, and the like, and a drive circuit that drives various control target devices. Each control unit includes a network I/F for performing communication with other control units via the communication network 7010, and includes a communication I/F for performing communication through wired communication or wireless communication with devices, sensors, or the like inside or outside the vehicle. In FIG. 14, a microcomputer 7610, a general-purpose communication I/F 7620, a dedicated communication I/F 7630, a positioning unit 7640, a beacon reception unit 7650, an in-vehicle device I/F 7660, an audio/image output unit 7670, a vehicle-mounted network I/F 7680, and a storage unit 7690 are shown as functional configurations of the integrated control unit 7600. The other control units also include a microcomputer, a communication I/F, a storage unit, and the like.

The drive system control unit 7100 controls the operation of devices related to the drive system of the vehicle according to various programs. For example, the drive system control unit 7100 functions as a control device for a driving force generation device for generating a driving force of the vehicle such as an internal combustion engine or a drive motor, a driving force transmission mechanism for transmitting the driving force to wheels, a steering mechanism for adjusting a steering angle of the vehicle, and a braking device for generating a braking force of a vehicle. The drive system control unit 7100 may have a function as a control device such as an antilock brake system (ABS) or electronic stability control (ESC).

A vehicle state detection unit 7110 is connected to the drive system control unit 7100. The vehicle state detection unit 7110 includes, for example, at least one of a gyro sensor that detects an angular velocity of an axial rotation motion of a vehicle body, an acceleration sensor that detects an acceleration of a vehicle, and sensors for detecting an amount of operation with respect to an accelerator pedal, an amount of operation with respect to a brake pedal, a steering angle of a steering wheel, an engine speed, a rotation speed of wheels, and the like. The drive system control unit 7100 performs arithmetic processing using a signal input from the vehicle state detection unit 7110 to control an internal combustion engine, a drive motor, an electric power steering device, a brake device, and the like.

The body system control unit 7200 controls operations of various devices equipped in the vehicle body in accordance with various programs. For example, the body system control unit 7200 functions as a control device of a keyless entry system, a smart key system, a power window device, or various lamps such as a head lamp, a back lamp, a brake lamp, a turn indicator, and a fog lamp. In this case, radio waves emitted from a portable device in place of a key or signals of various switches can be input to the body system control unit 7200. The body system control unit 7200 receives inputs of radio waves or signals and controls a door lock device, a power window device, and a lamp of the vehicle.

The battery control unit 7300 controls a secondary battery 7310 which is a power supply source of a driving motor in accordance with various programs. For example, information such as a battery temperature, a battery output voltage, or a remaining capacity of a battery is input from a battery device including the secondary battery 7310 to the battery control unit 7300. The battery control unit 7300 performs arithmetic processing using such a signal and performs temperature adjustment control of the secondary battery 7310 or control of a cooling device equipped in the battery device.

The vehicle exterior information detection unit 7400 detects external information of a vehicle on which the vehicle control system 7000 is mounted. For example, at least one of an imaging unit 7410 and a vehicle exterior information detector 7420 is connected to the vehicle exterior information detection unit 7400. The imaging unit 7410 includes at least one of a time-of-flight (ToF) camera, a stereo camera, a monocular camera, an infrared camera, and other cameras. The vehicle exterior information detector 7420 includes at least one of, for example, an environmental sensor detecting present weather or atmospheric phenomena and a surrounding information detection sensor detecting other vehicles, obstacles, pedestrians, and the like around a vehicle on which the vehicle control system 7000 is mounted.

The environmental sensor may be, for example, at least one of a raindrop sensor that detects rainy weather, a fog sensor that detects fog, a sunshine sensor that detects a degree of sunshine, and a snow sensor that detects snowfall. The surrounding information detection sensor may be at least one of an ultrasonic sensor, a radar device, and a light detection and ranging or laser imaging detection and ranging (LIDAR) device. The imaging unit 7410 and the vehicle exterior information detector 7420 may be included as independent sensors or devices or may be included as a device in which a plurality of sensors or devices are integrated.

Here, FIG. 17 illustrates an example of installation positions of the imaging unit 7410 and the vehicle exterior information detector 7420. Imaging units 7910, 7912, 7914, 7916, and 7918 are provided, for example, at at least one of a front nose, side mirrors, a rear bumper, a back door, and an upper part of a windshield in a vehicle cabin of the vehicle 7900. The imaging unit 7910 included in the front nose and the imaging unit 7918 included in the upper part of the windshield in the vehicle cabin mainly acquire an image in front of the vehicle 7900. The imaging units 7912 and 7914 included in the side mirrors mainly acquire images of the sides of the vehicle 7900. The imaging unit 7916 included in the rear bumper or the back door mainly acquires an image of the rear of the vehicle 7900. The imaging unit 7918 included in the upper part of the windshield in the vehicle cabin is mainly used for detection of a preceding vehicle, a pedestrian, an obstacle, a traffic light, a traffic sign, a lane, or the like.

In FIG. 17, an example of imaging ranges of the respective imaging units 7910, 7912, 7914, and 7916 is illustrated. An imaging range a indicates an imaging range of the imaging unit 7910 provided on the front nose, imaging ranges b and c indicate imaging ranges of the imaging units 7912 and 7914 provided on the side mirrors, and an imaging range d indicates an imaging range of the imaging unit 7916 provided on the rear bumper or the back door. For example, a bird's-eye view image of the vehicle 7900 as viewed from above can be obtained when the image data captured by the imaging units 7910, 7912, 7914, and 7916 are superimposed.

The vehicle exterior information detectors 7920, 7922, 7924, 7926, 7928, and 7930 provided on the front, rear, side, corners, and an upper part of the windshield in the vehicle cabin of the vehicle 7900 may be, for example, ultrasonic sensors or radar devices. The vehicle exterior information detectors 7920, 7926, and 7930 provided on the front nose, rear bumper, back door, and upper part of the windshield in the vehicle cabin of the vehicle 7900 may be, for example, LIDAR devices. These vehicle exterior information detectors 7920 to 7930 are mainly used for detection of preceding vehicles, pedestrians, obstacles, or the like.

The description will be continued with reference to FIG. 16 again. The vehicle exterior information detection unit 7400 causes the imaging unit 7410 to capture an image of the outside of the vehicle and receives the captured image data. Further, the vehicle exterior information detection unit 7400 receives detection information from the connected vehicle exterior information detector 7420. When the vehicle exterior information detector 7420 is an ultrasonic sensor, a radar device, or a LIDAR device, the vehicle exterior information detection unit 7400 transmits ultrasonic waves, electromagnetic waves, or the like, and receives information on received reflected waves. The vehicle exterior information detection unit 7400 may perform object detection processing or distance detection processing for a person, a vehicle, an obstacle, a sign, or a character on a road surface on the basis of the received information. The vehicle exterior information detection unit 7400 may perform environment recognition processing for recognizing rainfall, fog, road surface situation, or the like on the basis of the received information. The vehicle exterior information detection unit 7400 may calculate a distance to an object outside the vehicle on the basis of the received information.

Further, the vehicle exterior information detection unit 7400 may perform image recognition processing or distance detection processing for recognizing a person, a vehicle, an obstacle, a sign, a character on a road surface, or the like on the basis of the received image data. The vehicle exterior information detection unit 7400 may perform processing such as distortion correction or alignment on the received image data, and combine image data captured by the different imaging units 7410 to generate a bird's-eye view image or a panoramic image. The vehicle exterior information detection unit 7400 may perform viewpoint conversion processing using the image data captured by the different imaging units 7410.

The vehicle interior information detection unit 7500 detects vehicle interior information. For example, a driver state detection unit 7510 that detects a driver's state is connected to the vehicle interior information detection unit 7500. The driver state detection unit 7510 may include a camera that images a driver, a biological sensor that detects biological information of the driver, or a microphone that collects a sound in the vehicle cabin. The biological sensor is provided on, for example, a seat surface, a steering wheel, or the like and detects biological information of an occupant sitting on the seat or the driver holding the steering wheel. The vehicle interior information detection unit 7500 may calculate the degree of fatigue or the degree of concentration of the driver or determine whether the driver is drowsing based on detected information input from the driver state detection unit 7510. The vehicle interior information detection unit 7500 may perform a noise cancellation process or the like on a collected sound signal.

The integrated control unit 7600 controls an overall operation in the vehicle control system 7000 according to various programs. An input unit 7800 is connected to the integrated control unit 7600. The input unit 7800 is realized by a device such as a touch panel, a button, a microphone, a switch, or a lever, which can be input-operated by an occupant. Data obtained by recognizing a sound input by the microphone may be input to the integrated control unit 7600. The input unit 7800 may be, for example, a remote control device using infrared light or other radio waves or may be an externally connected device such as a mobile phone or a personal digital assistant (PDA) corresponding to an operation of the vehicle control system 7000. The input unit 7800 may be, for example, a camera. In this case, an occupant can input information by a gesture. Alternatively, data obtained by detecting a motion of a wearable device worn by an occupant may be input. Further, the input unit 7800 may include, for example, an input control circuit or the like that generates an input signal based on information input by an occupant or the like using the foregoing input unit 7800 and outputs the input signal to the integrated control unit 7600. The occupant or the like operates the input unit 7800 to input various kinds of data to the vehicle control system 7000 or instruct the vehicle control system 7000 to perform a processing operation.

A storage unit 7690 may include a read-only memory (ROM) that stores various programs executed by the microcomputer and a random access memory (RAM) that stores various parameters, calculation results, sensor values, or the like. The storage unit 7690 may be realized by a magnetic storage device such as a hard disc drive (HDD), a semiconductor storage device, an optical storage device, or a magneto-optical storage device.

The general-purpose communication I/F 7620 is a general-purpose communication I/F that mediates communication with various devices present in an external environment 7750. On the general-purpose communication I/F 7620, a cellular communication protocol such as Global System of Mobile Communications (GSM: registered trademark), WiMAX (registered trademark), Long Term Evolution (LTE: registered trademark), or LTE-Advanced (LTE-A) or other wireless communication protocols such as wireless LAN (also referred to as Wi-Fi (registered trademark)), or Bluetooth (registered trademark) may be mounted. The general-purpose communication I/F 7620 may be connected to, for example, a device (for example, an application server or a control server) present on an external network (for example, the Internet, a cloud network, or a business-specific network) via a base station or an access point. The general-purpose communication I/F 7620 may be connected to, for example, a terminal (for example, a terminal or a machine type communication (MTC) terminal of a driver, a pedestrian, or a store) that is around the vehicle using a peer-to-peer (P2P) technology.

The dedicated communication I/F 7630 is a communication I/F that supports a communication protocol designed for use in vehicles. The dedicated communication I/F 7630 may implement, for example, a standard protocol such as wireless access in vehicle environment (WAVE) which is a combination of the lower layer IEEE802.11p and the upper layer IEEE1609, dedicated short range communications (DSRC), or a cellular communication protocol. The dedicated communication I/F 7630 generally performs V2X communication that has a concept including one or more of vehicle-to-vehicle communication, vehicle-to-infrastructure communication, vehicle-to-home communication, and vehicle-to-pedestrian communication.

The positioning unit 7640 receives, for example, a global navigation satellite system (GNSS) signal from a GNSS satellite (for example, a global positioning system (GPS) signal from a GPS satellite) and performs positioning to generate positional information including latitude, longitude, and height of the vehicle. The positioning unit 7640 may specify a current position by exchanging signals with a wireless access point, or may acquire position information from a terminal such as a mobile phone, PHS, or smartphone having a positioning function.

The beacon reception unit 7650 receives radio waves or electromagnetic waves transmitted from a radio station or the like installed on a road, and acquires information such as a current position, traffic jam, no throughfare, or required time. The function of the beacon reception unit 7650 may be included in the above-described dedicated communication I/F 7630.

The in-vehicle device I/F 7660 is a communication interface that mediates a connection between the microcomputer 7610 and various in-vehicle devices 7760 present in the vehicle. The in-vehicle device I/F 7660 may establish wireless connection using a wireless communication protocol such as a wireless LAN, Bluetooth (registered trademark), near field communication (NFC), or wireless USB (WUSB). The in-vehicle device I/F 7660 may establish wired connection of universal serial bus (USB), High Definition Multimedia Interface (HDMI: registered trademark), Mobile High-definition Link (MHL), or the like via a connection terminal (not illustrated) (and a cable as necessary). The in-vehicle device 7760 may include, for example, at least one of a mobile device or wearable device of an occupant and an information device carried in or attached to the vehicle. Further, the in-vehicle device 7760 may include a navigation device that searches for a route to an arbitrary destination. The in-vehicle device I/F 7660 exchanges control signals or data signals with the in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 according to various programs on the basis of information acquired via at least one of the general-purpose communication I/F 7620, the dedicated communication I/F 7630, the positioning unit 7640, the beacon reception unit 7650, the in-vehicle device I/F 7660, and the vehicle-mounted network I/F 7680. For example, the microcomputer 7610 may calculate a control target value of the driving force generation device, the steering mechanism, or the braking device on the basis of the acquired information inside and outside the vehicle, and output a control command to the drive system control unit 7100. For example, the microcomputer 7610 may perform coordinated control to realize functions of advanced driver assistance system (ADAS) including vehicle collision avoidance or shock absorption, following travel based on an inter-vehicle distance, vehicle speed maintenance travel, a vehicle collision warning, and a vehicle lane departure warning. The microcomputer 7610 may perform coordinated control to perform automatic driving or the like in which a vehicle travels autonomously regardless of an operation of a driver by controlling a driving force generation device, a steering mechanism, or a braking device, or the like based on acquired surrounding information of the vehicle.

The microcomputer 7610 may generate 3-dimensional distance information between the vehicle and objects such as surrounding structures or people based on information acquired via at least one of the general-purpose communication I/F 7620, the dedicated communication I/F 7630, the positioning unit 7640, the beacon reception unit 7650, the in-vehicle device I/F 7660, and the vehicle-mounted network I/F 7680 and may generate local map information including surrounding information of a present position of the vehicle. The microcomputer 7610 may predict a danger such as collision of the vehicle, approach of a pedestrian, or entry into a traffic prohibition road based on the acquired information and may generate a warning signal. The warning signal may be, for example, a signal for generating a warning sound or turning on a warning lamp.

The audio/image output unit 7670 transmits an output signal of at least one of a sound or an image to an output device capable of visually or audibly notifying an occupant of the vehicle or the outside of the vehicle of information. In the example of FIG. 16, an audio speaker 7710, a display unit 7720, and an instrument panel 7730 are shown as output devices. The display unit 7720 may include at least one of, for example, an onboard display and a head-up display. The display unit 7720 may have an augmented reality (AR) display function. The output device may be not only such a device but also another device such as a headphone, a wearable device such as a glasses-type display worn by an occupant, a projector, or a lamp. When the output device is a display device, the display device visually displays results obtained through various processes performed by the microcomputer 7610 or information received from another control unit in various formats such as text, images, tables, and graphs. When the output device is a sound output device, the sound output device converts an audio signal formed by reproduced sound data, acoustic data, or the like into an analog signal and outputs the analog signal auditorily.

In the example illustrated in FIG. 16, at least two control units connected via the communication network 7010 may be integrated as one control unit. Alternatively, each control unit may be configured of a plurality of control units. Further, the vehicle control system 7000 may include other control units (not illustrated). Further, in the above description, the other control unit may have some or all of functions of any of the control units. That is, predetermined arithmetic processing may be performed by any of the control units as long as information is transmitted and received via the communication network 7010. Similarly, a sensor or device connected to any of the control units may be connected to the other control unit, and the plurality of control units may transmit and receive detection information to and from each other via the communication network 7010.

The example of the vehicle control system to which the technology according to the present disclosure is applied has been described above. The technology according to the present disclosure can apply the technology according to the imaging device of the present disclosure to, for example, the imaging units 7910, 7912, 7914, 7916, and 7918 among the above-described components. The imaging device of the present disclosure can acquire captured image information and object detection information alone (with one imaging device), and it is not necessary to additionally provide a sensor for acquiring object detection information, and thus it is possible to simplify the configuration of the vehicle control system and reduce the cost.

Configurations that can be Adopted by Present Disclosure

The present disclosure can also be configured as described below.
<<A. Imaging Device>>

[A-1] An imaging device including a pixel array part in which pixels including photoelectric conversion units are disposed, an image processing unit for imaging that acquires captured image information on the basis of a pixel signal output from each pixel of the pixel array part, and an object recognition processing unit that acquires object recognition information on the basis of the pixel signal output from each pixel of the pixel array part.

[A-2] The imaging device according to [A-1], wherein a color filter array including a colorless filter is provided in the pixel array part.

[A-3] The imaging device according to [A-2], wherein the image processing unit for imaging performs image processing using a neural network to which deep learning is applied and outputs the captured image information.

[A-4] The imaging device according to any one of [A-1] to [A-3], wherein the object recognition processing unit performs object recognition using a neural network to which deep learning is applied and outputs the object recognition information.

[A-5] The imaging device according to any one of [A-1] to [A-4], wherein each pixel of the pixel array part has a plurality of photoelectric conversion units having different sensitivities.

[A-6] The imaging device according to [A-6], wherein the plurality of photoelectric conversion units include a photoelectric conversion unit having a relatively large light receiving area and a photoelectric conversion unit having a relatively small light receiving area.

<<B. First Vehicle Control System>>

[B-1] A vehicle control system including an imaging device, wherein the imaging device includes a pixel array part in which pixels including photoelectric conversion units are disposed, an image processing unit for imaging that acquires captured image information on the basis of a pixel signal output from each pixel of the pixel array part, and an object recognition processing unit that acquires object recognition information on the basis of the pixel signal output from each pixel of the pixel array part.

[B-2] The vehicle control system according to [B-1], wherein a color filter array including a colorless filter is provided in the pixel array part.

[B-3] The vehicle control system according to [B-2], wherein the image processing unit for imaging performs image processing using a neural network to which deep learning is applied and outputs the captured image information.

[B-4] The vehicle control system according to any one of [B-1] to [B-3], wherein the object recognition processing unit performs object recognition using a neural network to which deep learning is applied and outputs the object recognition information.

[B-5] The vehicle control system according to any one of [B-1] to [B-4], wherein each pixel of the pixel array part has a plurality of photoelectric conversion units having different sensitivities.

[B-6] The vehicle control system according to [B-6], wherein the plurality of photoelectric conversion units include a photoelectric conversion unit having a relatively large light receiving area and a photoelectric conversion unit having a relatively small light receiving area.

[B-7] The vehicle control system according to any one of [B-1] to [B-6], including at least one of a laser scanner, a millimeter-wave radar, and an ultrasonic sensor in addition to the imaging device.

[B-8] The vehicle control system according to [B-8], wherein analog data is input to the image processing unit for imaging and the object recognition processing unit from the pixel array part and at least one of a laser scanner, a millimeter-wave radar, and an ultrasonic sensor, and the object recognition processing unit includes a previous-stage circuit unit that performs object detection using a neural network to which deep learning is applied on the basis of the analog data, and a subsequent-stage circuit unit that perform object recognition using the neural network to which deep learning is applied on the basis of output data of the previous-stage circuit unit.

<<C. Second Vehicle Control System>>

[C-1] A vehicle control system including an imaging device,
an image signal processing unit that processes a pixel signal output from the imaging device, and
a signal processing unit that processes a signal processed by the image signal processing unit, wherein
the imaging device includes
a pixel array part in which pixels including photoelectric conversion units are disposed, and
a read circuit that reads signals from a plurality of the pixels of the pixel array part, the image signal processing unit includes
an image processing unit for imaging that acquires captured image information on the basis of the pixel signal output from the imaging device, and
an object recognition processing unit that acquires object recognition information on the basis of the pixel signal output from the imaging device, and
the signal processing unit acquires information on a distance between a host vehicle equipped with the imaging device and an object around the host vehicle on the basis of the object recognition information acquired by the object recognition processing unit, determines that the host vehicle is in a dangerous driving state when the distance between the host vehicle and surrounding objects is less than a predetermined threshold value, and acquires the captured image information through the image processing unit for imaging.

[C-2] The vehicle control system according to [C-1], wherein a color filter array including a colorless filter is provided in the pixel array part.

[C-3] The vehicle control system according to [C-2], wherein the image processing unit for imaging performs image processing using a neural network to which deep learning is applied and outputs the captured image information.

[C-4] The vehicle control system according to any one of [C-1] to [C-3], wherein the object recognition processing unit performs object recognition using a neural network to which deep learning is applied and outputs the object recognition information.

[C-5] The vehicle control system according to any one of [C-1] to [C-4], wherein each pixel of the pixel array part has a plurality of photoelectric conversion units having different sensitivities.

[C-6] The vehicle control system according to [C-6], wherein the plurality of photoelectric conversion units include a photoelectric conversion unit having a relatively large light receiving area and a photoelectric conversion unit having a relatively small light receiving area.

[C-7] The vehicle control system according to any one of [C-1] to [C-6], including at least one of a laser scanner, a millimeter-wave radar, and an ultrasonic sensor in addition to the imaging device.

[C-8] The vehicle control system according to [C-7], wherein analog data is input to the image processing unit for imaging and the object recognition processing unit from the pixel array part and at least one of a laser scanner, a millimeter-wave radar, and an ultrasonic sensor, and the object recognition processing unit includes a previous-stage circuit unit that performs object detection using a neural network to which deep learning is applied on the basis of the analog data, and a subsequent-stage circuit unit that perform object recognition using the neural network to which deep learning is applied on the basis of output data of the previous-stage circuit unit.

[C-9] The vehicle control system according to any one of [C-1] to [C-6], wherein the image signal processing unit is included in the imaging device.

[C-10] The vehicle control system according to [C-7], wherein the object recognition processing unit acquires information on a distance between a host vehicle and an object around the host vehicle on the basis of a signal input from at least one of the imaging device, the laser scanner, the millimeter-wave radar, and the ultrasonic sensor.

[C-11] The vehicle control system according to [C-10], wherein, when the distance between the host vehicle and the object around the host vehicle is less than a predetermined threshold value, the signal processing unit determines that the host vehicle is in a dangerous driving state, acquires a captured image through the image processing unit for imaging, and causes a display device to display the captured image.

[C-12] The vehicle control system according to [C-10], wherein, when the distance between the host vehicle and the object around the host vehicle is less than the predetermined threshold value, the signal processing unit determines that the host vehicle is in a dangerous driving state, acquires a captured image through the image processing unit for imaging, and causes a storage unit to store the captured image.

REFERENCE SINGS LIST

10 Imaging device
11 Pixel array part
12 Row control unit
13 Read circuit unit
14 Image signal processing unit
15 Storage unit
16 Imaging control unit
20 Pixel
21L High-sensitivity photodiode
21S Low-sensitivity photodiode
22_1, 22_2 Transfer transistor
23 Floating diffusion unit
24 Reset transistor
25 Connection transistor
26 Amplification transistor
27 Select transistor
28 Pixel internal capacitance element
31 ($31_1$ to $31_m$) Pixel control line
32 ($32_1$ to $32_n$) Vertical signal line
40 Application processor
50 Position sensor
60 User interface
70 Map database
80 Wireless transceiver
100A Vehicle control system according to first embodiment
100B Vehicle control system according to second embodiment
100C Vehicle control system according to third embodiment
100D Vehicle control system according to fourth embodiment 110 Laser scanner
120 Millimeter-wave radar
130 Ultrasonic sensor
141 Image processing unit for imaging
142 Object recognition processing unit

The invention claimed is:

1. An imaging device, comprising:
a pixel array part comprising a plurality of pixels, wherein each pixel of the plurality of pixels comprises a plurality of photodiodes; and
circuitry configured to:
acquire captured image information based on of a pixel signal output from each pixel of the pixel array part; and
acquire object recognition information based on the pixel signal output from each pixel of the pixel array part, wherein
the plurality of photodiodes includes a first photodiode having a first sensitivity and a second photodiode having a second sensitivity higher than the first sensitivity, and
a cathode of the first photodiode is directly connected to a transfer transistor and a pixel internal capacitance element.

2. The imaging device according to claim 1, wherein a color filter array including a colorless filter is in the pixel array part.

3. The imaging device according to claim 2, wherein the circuitry is further configured to:
perform an image processing operation using a neural network to which deep learning is applied; and
output the captured image information.

4. The imaging device according to claim 1, wherein the circuitry is further configured to:
perform object recognition using a neural network to which deep learning is applied; and
output the object recognition information.

5. The imaging device according to claim 1, wherein the first photodiode has a first light receiving area and the second photodiode has a second light receiving area larger than the first light receiving area.

6. A vehicle control system, comprising:
an imaging device, wherein the imaging device includes:
a pixel array part comprising a plurality of pixels, wherein each pixel of the plurality of pixels comprises a plurality of photodiodes; and
circuitry configured to:
acquire captured image information based on a pixel signal output from each pixel of the pixel array part; and
acquire object recognition information based on the pixel signal output from each pixel of the pixel array part, wherein
analog data is input to the circuitry from the pixel array part and at least one of a laser scanner, a millimeter-wave radar, or an ultrasonic sensor, and
the circuitry is further configured to:
perform object detection using a neural network to which deep learning is applied based on the analog data; and
perform object recognition using the neural network to which deep learning is applied based on data indicating the object detection.

7. The vehicle control system according to claim 6, comprising:
at least one of the laser scanner, the millimeter-wave radar, or the ultrasonic sensor in addition to the imaging device.

8. A vehicle control system, comprising:
an imaging device; and
first circuitry configured to process a pixel signal output from the imaging device; and
second circuitry configured to process signal processed by the first circuitry, wherein
the imaging device includes:
a pixel array part comprising a plurality of pixels, wherein each pixel of the plurality of pixels comprises a plurality of photodiodes; and
a read circuit configured to read signals from the plurality of the pixels of the pixel array part,
the first circuitry is further configured to:
acquire captured image information based on the pixel signal output from the imaging device; and
acquire object recognition information based on the pixel signal output from the imaging device,
the second circuitry is further configured to:
acquire information on a distance between a host vehicle equipped with the imaging device and an object around the host vehicle, based on the acquired object recognition information;
determine the host vehicle is in a dangerous driving state when the distance between the host vehicle and the object is less than a threshold value; and
acquire the captured image information through the first circuitry,
analog data is input to the first circuitry from the pixel array part and at least one of a laser scanner, a millimeter-wave radar, or an ultrasonic sensor, and
the first circuitry is further configured to:
perform object detection using a neural network to which deep learning is applied based on the analog data; and
perform object recognition using the neural network to which deep learning is applied based on data indicating the object detection.

9. The vehicle control system according to claim 8, comprising:
at least one of the laser scanner, the millimeter-wave radar, or the ultrasonic sensor in addition to the imaging device.

10. The vehicle control system according to claim 9, wherein the first circuitry is further configured to acquire information on the distance between the host vehicle and the object around the host vehicle, based on a signal input from at least one of the imaging device, the laser scanner, the millimeter-wave radar, or the ultrasonic sensor.

11. The vehicle control system according to claim 10, wherein, when the distance between the host vehicle and the object around the host vehicle is less than the threshold value, the second circuitry is further configured to:
acquire a captured image through the first circuitry; and
cause a display device to display the captured image.

12. The vehicle control system according to claim 10, wherein, when the distance between the host vehicle and the object around the host vehicle is less than the threshold value, the second circuitry is further configured to
acquire a captured image through the first circuitry; and
cause a memory circuit to store the captured image.

* * * * *